(12) United States Patent
Kanamaru

(10) Patent No.: US 10,261,730 B2
(45) Date of Patent: Apr. 16, 2019

(54) ELECTRONIC SYSTEM

(71) Applicant: KYOCERA Document Solutions Inc., Osaka (JP)

(72) Inventor: Kazuhiro Kanamaru, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/979,901

(22) Filed: May 15, 2018

(65) Prior Publication Data
US 2018/0349067 A1 Dec. 6, 2018

(30) Foreign Application Priority Data

May 30, 2017 (JP) .................................. 2017-107237

(51) Int. Cl.
*G06F 3/12* (2006.01)
*H04W 4/02* (2018.01)
*H04N 1/00* (2006.01)

(52) U.S. Cl.
CPC .......... *G06F 3/1204* (2013.01); *G06F 3/1226* (2013.01); *H04N 1/00413* (2013.01); *H04W 4/023* (2013.01); *G06F 3/1292* (2013.01)

(58) Field of Classification Search
CPC .... G06F 3/1204; G06F 3/1226; G06F 3/1292; H04W 4/023; H04N 1/00413

USPC ........................................................ 358/1.13
See application file for complete search history.

(56) References Cited

U.S. PATENT DOCUMENTS

| 2013/0329253 A1* | 12/2013 | Sasaki | H04N 1/0035 358/1.15 |
| 2016/0219406 A1* | 7/2016 | Hibara | H04L 67/1021 |
| 2018/0027133 A1* | 1/2018 | Sato | H04N 1/00411 358/1.15 |

FOREIGN PATENT DOCUMENTS

JP 2013-256060 A 12/2013

* cited by examiner

Primary Examiner — Neil R McLean
(74) Attorney, Agent, or Firm — IP Business Solutions, LLC

(57) ABSTRACT

An electronic system includes an electronic apparatus and a mobile terminal that transmits instruction signals to the electronic apparatus to allow the electronic apparatus to perform a plurality of various functions. When a plurality of the mobile terminals exist within a predetermined distance and transmit the respective instruction signals for allowing the electronic apparatus to perform the same function, an operation control section of the electronic apparatus performs the function indicated by the instruction signal transmitted from, of the plurality of the mobile terminals, the mobile terminal located nearest to the electronic apparatus.

10 Claims, 20 Drawing Sheets

| DISTANCE (d) | FUNCTION | OPERATING BUTTON |
|---|---|---|
| $d \leq A$ | ALL FUNCTIONS AVAILABLE | DISPLAY BUTTONS d1-d6 |
| $A < d \leq B$ | COPY SEND NOT AVAILABLE FAX | NOT DISPLAY BUTTONS d1-d3 DISPLAY BUTTONS d4-d6 |
| $d > B$ | ALL FUNCTIONS NOT AVAILABLE | NOT DISPLAY BUTTONS d1-d6 |

230 STORAGE SECTION

■REGION WHEN USER APPROACHES IMAGE FORMING APPARATUS

■REGION WHEN USER LEAVES IMAGE FORMING APPARATUS

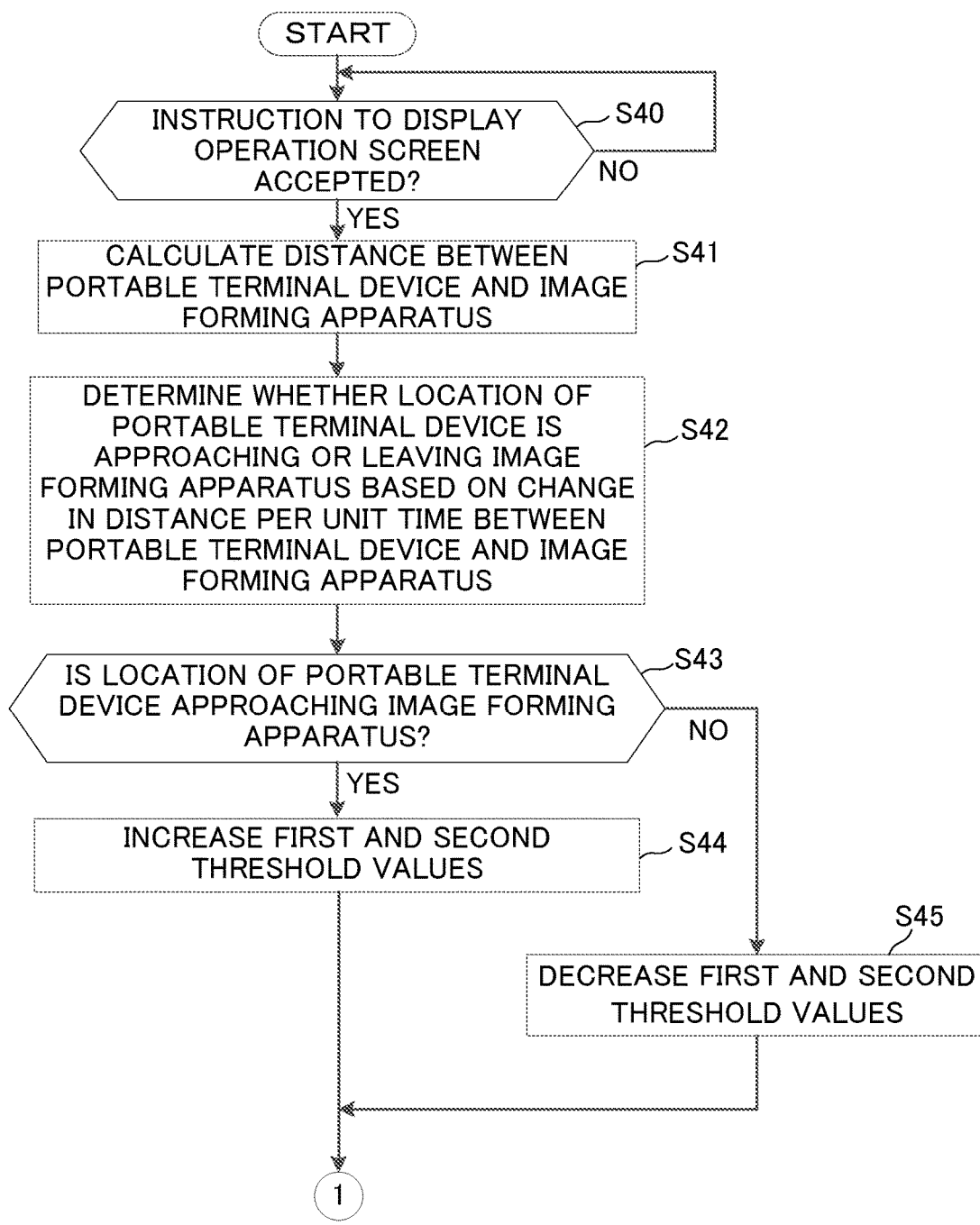

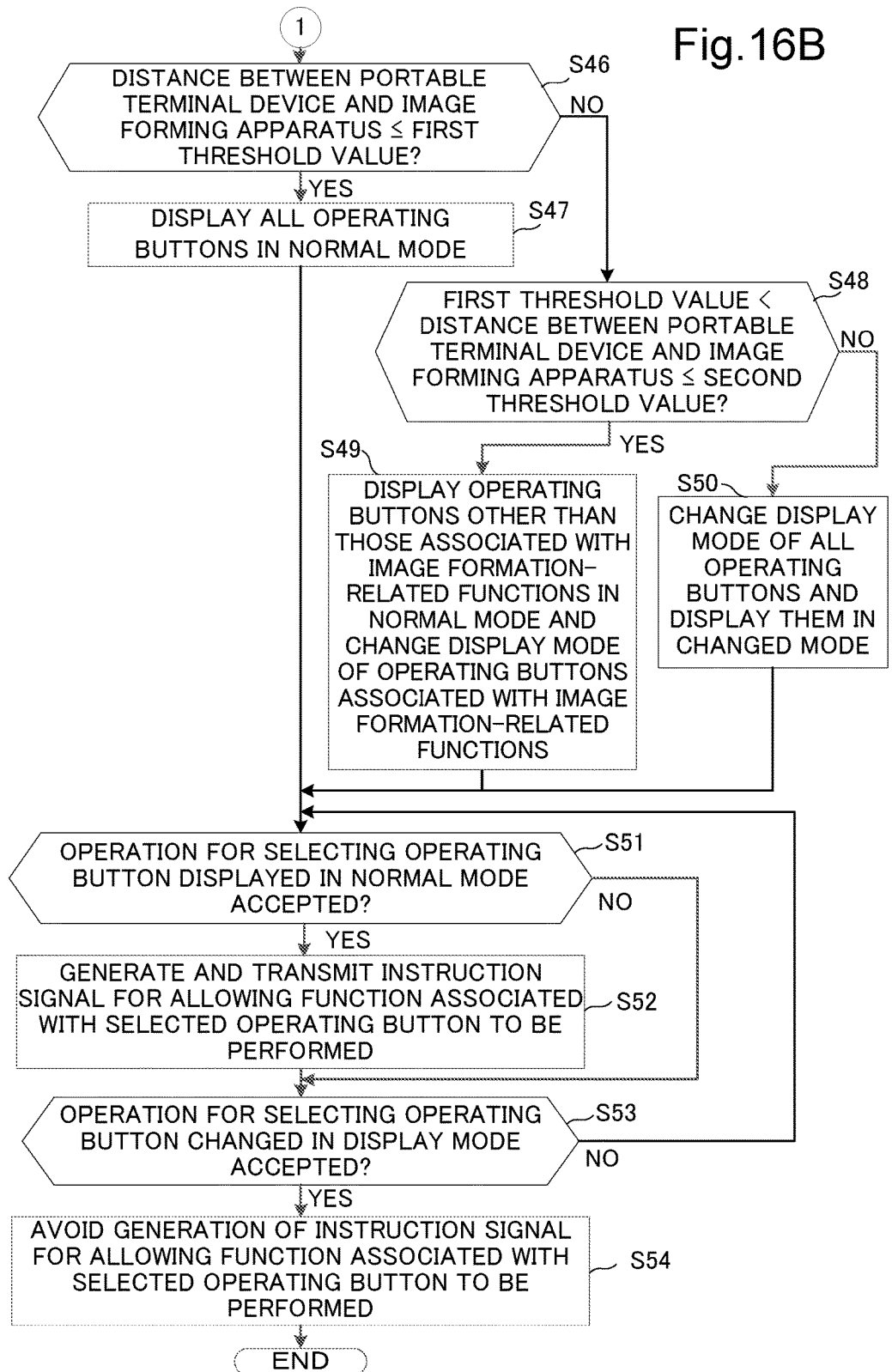

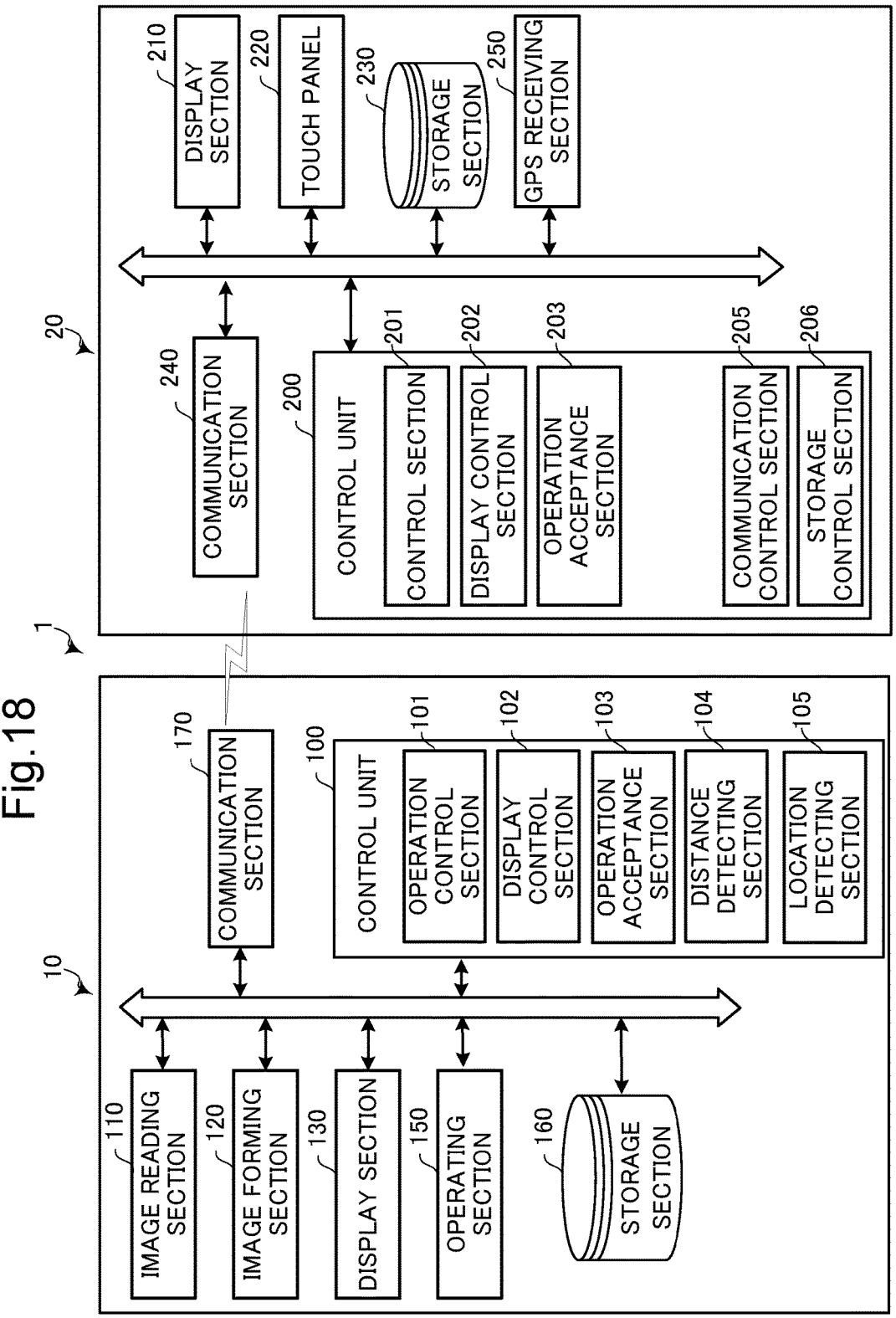

ELECTRONIC SYSTEM

INCORPORATION BY REFERENCE

This application claims priority to Japanese Patent Application No. 2017-107237 filed on May 30, 2017, the entire contents of which are incorporated by reference herein.

BACKGROUND

The present disclosure relates to electronic systems, electronic apparatuses, and mobile terminals and particularly relates to a technique for allowing an external electronic apparatus to perform various functions under the control of a mobile terminal.

Recently, there have emerged techniques for allowing an external electronic apparatus to perform various functions under the control of a mobile terminal. For example, there is a system constituted by an image forming apparatus and a mobile terminal connected via a network to the image forming apparatus. In this system, when a user inputs various instructions on an operation screen displayed on the mobile terminal, the user can allow the external image forming apparatus to perform functions related to image processing, such as copying or scanning.

SUMMARY

A technique improved over the above technique is proposed as one aspect of the present disclosure.

An electronic system according to an aspect of the present disclosure includes an electronic apparatus and a mobile terminal. The mobile terminal transmits instruction signals to the electronic apparatus to allow the electronic apparatus to perform a plurality of various functions. The electronic apparatus includes a control unit. The control unit includes a processor and functions, through the processor executing a control program, as a distance detecting section and an operation control section. The distance detecting section detects a distance from the mobile terminal. The operation control section performs a function indicated by the instruction signal transmitted from the mobile terminal when the distance from the mobile terminal detected by the distance detecting section is within a predetermined distance. When a plurality of the mobile terminals exist within the predetermined distance and transmit the respective instruction signals for allowing the electronic apparatus to perform the same function, the operation control section performs the function indicated by the instruction signal transmitted from, of the plurality of the mobile terminals, the mobile terminal located nearest to the electronic apparatus.

An electronic apparatus according to another aspect of the present disclosure performs a function according to an instruction signal transmitted from a mobile terminal. The electronic apparatus includes a control unit. The control unit includes a processor and functions, through the processor executing a control program, as a distance detecting section and an operation control section. The distance detecting section detects a distance from the mobile terminal. The operation control section performs the function indicated by the instruction signal transmitted from the mobile terminal when the distance from the mobile terminal detected by the distance detecting section is within a predetermined distance. When a plurality of the mobile terminals exist within the predetermined distance and transmit the respective instruction signals for allowing the electronic apparatus to perform the same function, the operation control section performs the function indicated by the instruction signal transmitted from, of the plurality of the mobile terminals, the mobile terminal located nearest to the electronic apparatus.

A mobile terminal according to still another aspect of the present disclosure transmits instruction signals to an external electronic apparatus to allow the electronic apparatus to perform a plurality of functions. The mobile terminal includes a communication section, a display section, and a control unit. The communication section is capable of transferring data to and from the electronic apparatus. The control unit includes a processor and functions, through the processor executing a control program, as a communication control section, a display control section, an operation acceptance section, and a location detecting section. The communication control section controls a communication operation of the communication section. The display control section controls a display operation of the display section and allows the display section to display an operation screen for accepting therethrough a function to be performed by the electronic apparatus. The operation acceptance section accepts a user's operation on the operation screen displayed on the display section. The location detecting section detects a location of the mobile terminal. A plurality of operating buttons associated with the respective functions performable by the electronic apparatus are provided on the operation screen. When the operation acceptance section accepts a selection operation for selecting one of the plurality of operating buttons provided on the operation screen, the communication control section allows the communication section to transmit to the electronic apparatus an instruction signal for allowing the electronic apparatus to perform the function associated with the selected operating button. The display control section changes, according to a relative location between the location of the mobile terminal detected by the location detecting section and a location of the electronic apparatus, contents of the plurality of operating buttons provided on the operation screen.

BRIEF DESCRIPTION OF THE DRAWINGS

FIGS. 16A and 16B are flowcharts showing an operation flow of a portable terminal device according to still another embodiment of the present disclosure.

FIG. 18 is a block diagram showing an internal configuration of an electronic system according to a modification.

DETAILED DESCRIPTION

Hereinafter, a description will be given of a mobile terminal, an electronic apparatus, and an electronic system all according to an embodiment of the present disclosure with reference to the drawings.

Embodiment 1

Figure 1:
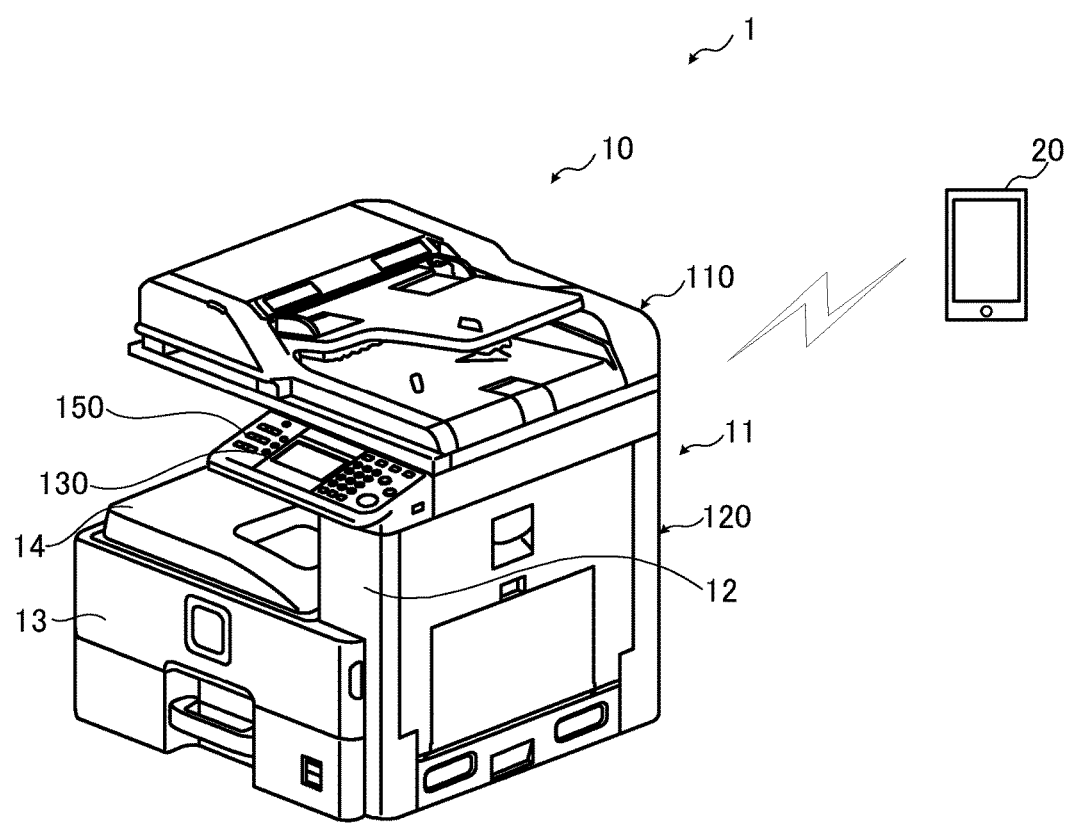
FIG. 1 is a perspective view showing the configuration of an electronic system according to one embodiment of the present disclosure.
Figure 2:
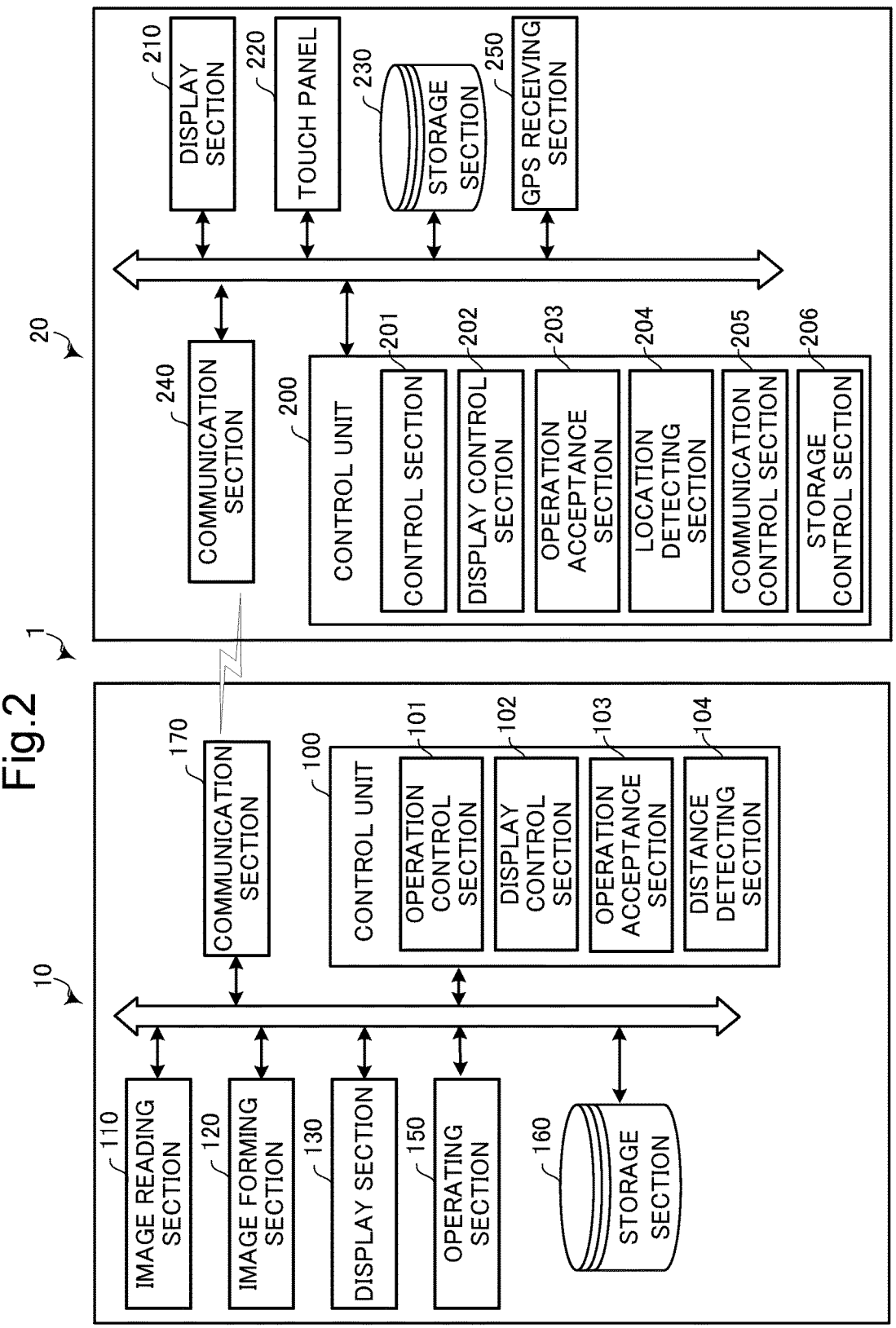
FIG. 2 is a block diagram showing an internal configuration of the electronic system according to the one embodiment of the present disclosure.

FIG. 1 is a perspective view showing the configuration of an electronic system according to an embodiment of the present disclosure. FIG. 2 is a block diagram showing an internal configuration of the electronic system according to the embodiment of the present disclosure.

The electronic system 1 includes an image forming apparatus 10 and a portable terminal device 20 (an example of the mobile terminal) communicable with the image forming apparatus 10. The portable terminal device 20 generates various instruction signals based on user's operations on a touch panel 220 and transmits the generated instruction signals to the image forming apparatus 10, thus allowing the image forming apparatus 10 to perform various functions. The image forming apparatus 10 is an example of the electronic apparatus having various functions. The present disclosure is applicable not only to the image forming apparatus 10 but also to other types of electronic apparatuses, such as a PC (personal computer) or a digital signage apparatus.

First, a description will be given of the structure and configuration of the image forming apparatus 10. The image forming apparatus 10 is a multifunction peripheral having a plurality of functions, for example, a copy function, a print function, a scan function, and a facsimile function. The image forming apparatus 10 is roughly composed of an apparatus body 11, an image reading section 110 disposed above the apparatus body 11, and a connecting portion 12 provided between the image reading section 110 and the apparatus body 11.

The apparatus body 11 is made up by including an image forming section 120, a sheet feed section 13, and so on.

In an image forming operation of the image forming apparatus 10, the image forming section 120 forms a toner image on a recording sheet fed from the sheet feed section 13 based on, for example, an image read by the image reading section 110. Thereafter, the toner image formed on the recording sheet is heat fixed by an unshown fixing section. The recording sheet having an image fixed thereon by the completion of the fixing is discharged to a sheet output tray 14.

A display section 130 and an operating section 150 are disposed at the front of a housing forming a shell of the image forming apparatus 10. The display section 130 is formed by including a liquid crystal display (LCD) or an organic light-emitting diode (OLED) display.

The operating section 150 is hard keys including, for example, a menu key for calling up a menu, arrow keys for moving the focus of a GUI forming the menu, a determination key for performing a determination operation for the GUI forming the menu, and so on.

A storage section 160 is a large storage device, such as an HDD (hard disk drive).

A communication section 170 is a network interface composed of a communication module, such as a wireless LAN board.

The image forming apparatus 10 further includes a control unit 100. The control unit 100 is made up by including a processor, a RAM (random access memory), a ROM (read only memory), and a dedicated hardware circuit. The processor is, for example, a CPU (central processing unit), an FPGA (field programmable gate array) or an ASIC (application specific integrated circuit). The control unit 100 functions as an operation control section 101, a display control section 102, an operation acceptance section 103, and a distance detecting section 104 by operation of the processor in accordance with a control program stored in the storage section 160 or the like. However, each constituent section above may not be implemented by the operation of the control unit 100 in accordance with the control program but may be constituted by a hardware circuit.

The operation control section 101 governs the overall operation control of the image forming apparatus 10. The operation control section 101 is connected to the image reading section 110, the image forming section 120, the display section 130, the operating section 150, the storage section 160, the communication section 170, and so on. The operation control section 101 performs the operation control of the above components connected thereto and signal or data transfer to and from the components. Particularly, the operation control section 101 controls the operations of the image reading section 110, the image forming section 120 or other sections according to an instruction signal transmitted from the portable terminal device 20, thus performing a function related to image processing, such as a copy function or a scan function.

The display control section 102 has the function of controlling the display operation of the display section 130.

The operation acceptance section 103 has the function of accepting a user's operation using the operating section 150, such as a hard key.

The distance detecting section 104 has the function of detecting the distance between the image forming apparatus 10 and the portable terminal device 20. Although described in detail hereinafter, the portable terminal device 20 is provided with a GPS receiving section 250 capable of receiving a GPS (global positioning system) signal. The portable terminal device 20 transmits to the image forming apparatus 10 GPS signals received by the GPS receiving section 250 or location information indicating the location of the portable terminal device 20 identified from the GPS signals. The distance detecting section 104 identifies the location of the portable terminal device 20 based on the above GPS signals or location information transmitted from the portable terminal device 20. Furthermore, when the user has input to the image forming apparatus 10 the location information on the image forming apparatus 10 using the operating section 150 or the like, the distance detecting section 104 identifies the location of the image forming apparatus 10 from the input location information. Alternatively, when the image forming apparatus 10 includes a GPS receiving section (not shown), the distance detecting section 104 may identify the location of the image forming apparatus 10 from GPS signals acquired by the GPS receiving section. The distance detecting section 104 detects the distance between the image forming apparatus 10 and the portable terminal device 20 based on the locations of the image forming apparatus 10 and the portable terminal device 20 identified in the above processing.

Next, a description will be given of the structure and configuration of the portable terminal device 20. The portable terminal device 20 is a portable mobile device, such as a smartphone, and includes a control unit 200, a display section 210, a touch panel 220, a storage section 230, a communication section 240, a GPS receiving section 250, and so on.

The display section 210 is formed of a liquid crystal display (LCD), an organic light-emitting diode (OLED) display or the like. The display section 210 displays, under the control of a display control section 202 to be described later, an operation screen for accepting therethrough an instruction for the image forming apparatus 10, a setting screen or other screens.

The touch panel 220 is disposed at the front of the display section 210 and, upon detection of a user's touch thereon, outputs a detection signal indicating the coordinate position of the contact point to an operation acceptance section 203 described below and so on.

The storage section 230 is a large storage device, such as an HDD.

The communication section 240 is a network interface composed of a communication module, such as a wireless LAN chip.

The GPS receiving section 250 receives respective GPS signals transmitted from a plurality of GPS satellites and outputs them to a location detecting section 204 described below.

The control unit 200 is made up by including a processor, a RAM, a ROM, and a dedicated hardware circuit. The processor is, for example, a CPU, an FPGA or an ASIC. The control unit 200 functions as a control section 201, a display control section 202, an operation acceptance section 203, a location detecting section 204, a communication control section 205, and a storage control section 206 by operation of the processor in accordance with a control program stored in the storage section 230 or the like. However, each constituent section above may not be implemented by the operation of the control unit 200 in accordance with the control program but may be constituted by a hardware circuit.

The control section 201 governs the overall operation control of the portable terminal device 20. The control section 201 is connected to the display section 210, the touch panel 220, the storage section 230, the communication section 240, the GPS receiving section 250, and so on. The control section 201 performs the operation control of the above components connected thereto and signal or data transfer to and from the components.

The display control section 202 has the function of controlling the display operation of the display section 210.

The operation acceptance section 203 has the function of accepting, based on a detection signal output from the touch panel 220, a user's operation on the touch panel 220.

The location detecting section 204 has the function of detecting the location of the portable terminal device 20. A plurality of GPS signals output from the GPS receiving section 250 each contain information on the location and the time of transmission of the relevant GPS satellite having transmitted the GPS signal. The location detecting section 204 can calculate the location of the portable terminal device 20 based on the information on the locations and times of transmission contained in these GPS signals.

The communication control section 205 has the function of controlling the communication operation of the communication section 240.

The storage control section 206 has the function of controlling the storage operation of the storage section 230.

Figure 3:
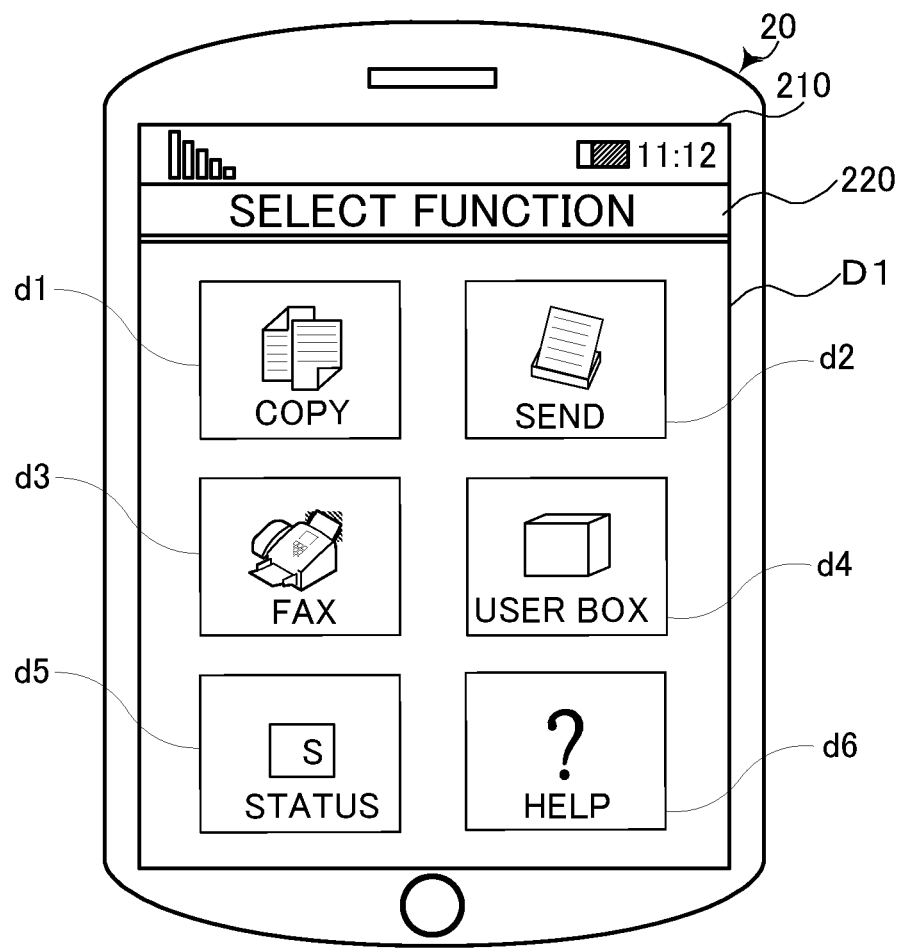
FIG. 3 is a view showing an example of an operation screen displayed on a display section of a portable terminal device according to the one embodiment of the present disclosure.

FIG. 3 is a view showing an example of an operation screen displayed on the display section 210. On an operation screen D1 shown in FIG. 3, there are arranged a plurality of operating buttons d1 to d6 associated with respective functions performable by the image forming apparatus 10. When the operation acceptance section 203 accepts a selection operation for selecting one of the plurality of operating buttons d1 to d6, the communication control section 205 generates an instruction signal for allowing the image forming apparatus 10 to perform the function associated with the selected operating button. Then, the communication control section 205 allows the communication section 240 to transmit the generated instruction signal to the image forming apparatus 10.

Figure 4:
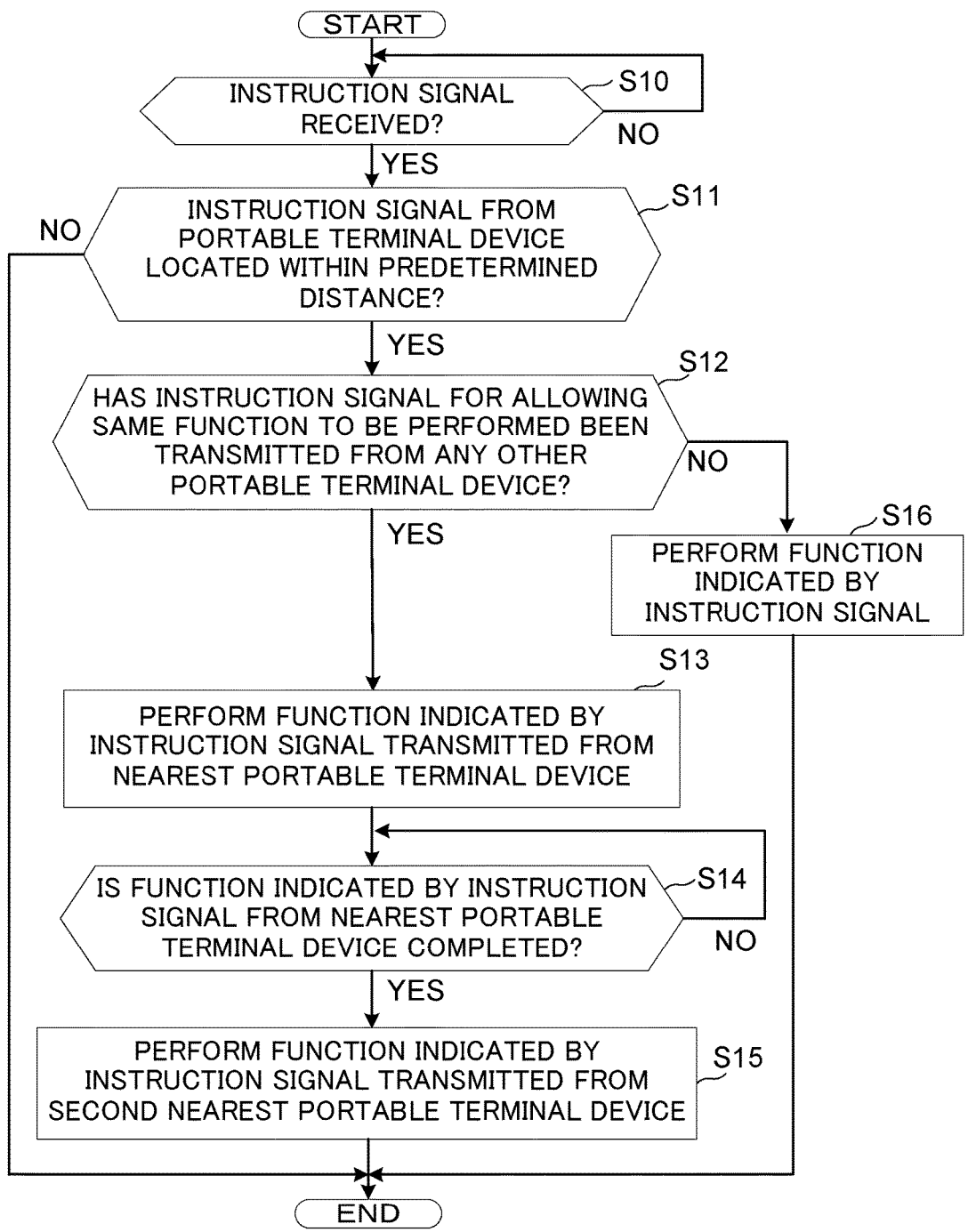
FIG. 4 is a flowchart showing an operation flow of an image forming apparatus according to the one embodiment of the present disclosure.

FIG. 4 is a flowchart showing an operation flow of the image forming apparatus 10. When the communication section 170 receives an instruction signal transmitted from the portable terminal device 20 (YES in step S10), the operation control section 101 executes processing for determining whether the portable terminal device 20 having transmitted the instruction signal is located within a predetermined distance from the location of the image forming apparatus 10 (step S11). The operation control section 101 executes the processing of step S11 using information acquired by the distance detecting section 104 through the processing previously described.

If the portable terminal device 20 having transmitted the instruction signal is located outside the predetermined distance from the location of the image forming apparatus 10 (NO in step S11), the image forming apparatus 10 ends processing. In other words, when the instruction signal has been transmitted from the portable terminal device 20 located outside the predetermined distance, the image forming apparatus 10 does not execute processing indicated by the instruction signal. On the other hand, if the portable terminal device 20 having transmitted the instruction signal is located within the predetermined distance from the location of the image forming apparatus 10 (YES in step S11), the image forming apparatus 10 executes processing of step S12 and later steps.

Figure 5:
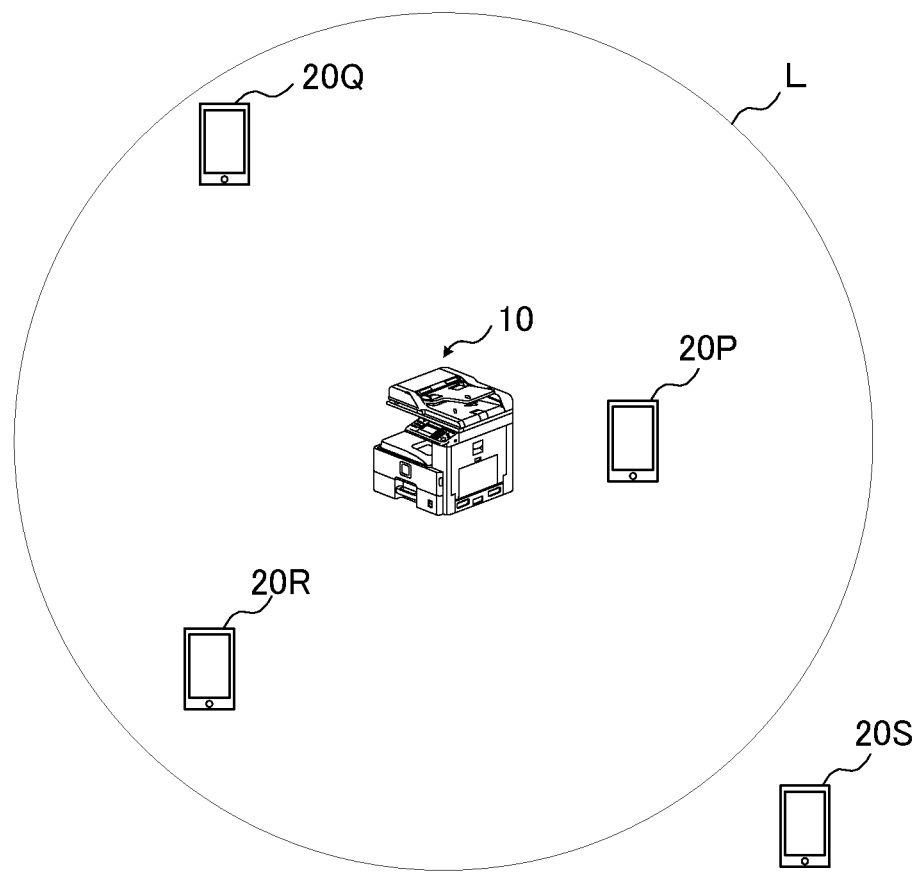
FIG. 5 is a view showing an example of the relative locations of an image forming apparatus and portable terminal devices according to the one embodiment of the present disclosure.

In an example shown in FIG. 5, the image forming apparatus 10 performs functions based on instruction signals transmitted from portable terminal devices 20P, 20Q, and 20R located within a predetermined distance L, but does not perform, even if an instruction signal is transmitted from a portable terminal device 20S located outside the predetermined distance L, a function based on the instruction signal.

Referring back to FIG. 4, the operation control section 101 determines whether or not an instruction signal for allowing the image forming apparatus 10 to perform the same function as the function indicated by the instruction signal received in the processing of step S10 has been transmitted from any other portable terminal device 20 (step S12). If any instruction signal for allowing the image forming apparatus 10 to perform the same function as the function indicated by the instruction signal received in the processing of step S10 has not been transmitted from any other portable terminal device 20 (NO in step S12), the operation control section 101 performs the function indicated by the instruction signal received in the processing of step S10 (step S16). For example, if the communication section 170 receives an instruction signal for allowing the image forming apparatus 10 to perform an image formation function from a portable terminal device 20 in the processing of step S10 and also receives an instruction signal for allowing the image forming apparatus 10 to perform a facsimile function from another portable terminal device 20, the execution of the image formation function and the execution of the facsimile function do not interfere with each other. Therefore, in this case, the operation control section 101 need not determine which instruction signal should be given priority to perform a function.

On the other hand, if any instruction signal for allowing the image forming apparatus 10 to perform the same function as the function indicated by the instruction signal received in the processing of step S10 has been transmitted from any other portable terminal device 20 (YES in step S12), the operation control section 101 performs the function indicated by the instruction signal transmitted from, of a plurality of portable terminal devices 20 located within the predetermined distance from the location of the image forming apparatus 10, a portable terminal device 20 located nearest to the location of the image forming apparatus 10 (step S13). In the example shown in FIG. 5, the operation control section 101 performs the function indicated by the instruction signal transmitted from the portable terminal device 20P.

Then, when the execution of the function indicated by the instruction signal transmitted from the portable terminal device 20 located nearest to the image forming apparatus 10 is completed (YES in step S14), the operation control section 101 performs the function indicated by the instruction signal transmitted from a portable terminal device 20 located second nearest to the image forming apparatus 10 (step S15). In the example shown in FIG. 5, the operation control section 101 performs the function indicated by the instruction signal transmitted from the portable terminal device 20R.

The operation control section 101 repeatedly executes the above processing from step S13 to step S15 to sequentially perform functions indicated by instruction signals transmitted from a plurality of portable terminal devices 20 located within the predetermined distance from the location of the image forming apparatus 10. For example, if the communication section 170 receives an instruction signal for allowing the image forming apparatus 10 to perform an image formation function from a portable terminal device 20 in the processing of step S10 and also receives an instruction signal for allowing the image forming apparatus 10 to perform an image formation function from another portable terminal device 20, the executions of the function indicated by both the instruction signals interfere with each other. Even in such a situation, in the present disclosure, the executions of the same function concurrently instructed by a plurality of instruction signals can be achieved by the above processing of executing earlier an instruction based on an instruction signal given a higher priority.

Meanwhile, the technique described in BACKGROUND does not assume the case where a plurality of mobile terminals transmit their respective instruction signals to an electronic apparatus. Particularly, it is not clear in the above technique, in the case where a plurality of mobile terminals transmit to the electronic apparatus their respective instruction signals for allowing the electronic apparatus to perform the same function (for example, a scan function), which instruction signal should be given priority to perform the scan function.

Unlike the above, in this embodiment, when a plurality of mobile terminals transmit their respective instruction signals to the electronic apparatus, the executions of the function instructed by the plurality of instruction signals can be achieved by executing earlier an instruction based on an instruction signal given a higher priority.

Embodiment 2

In a portable terminal device 20 according to Embodiment 2, the display control section 202 changes, according to the relative location of the portable terminal device 20 and the image forming apparatus 10, the contents of the plurality of operating buttons provided on the operation screen displayed by the display section 210.

Figure 6:
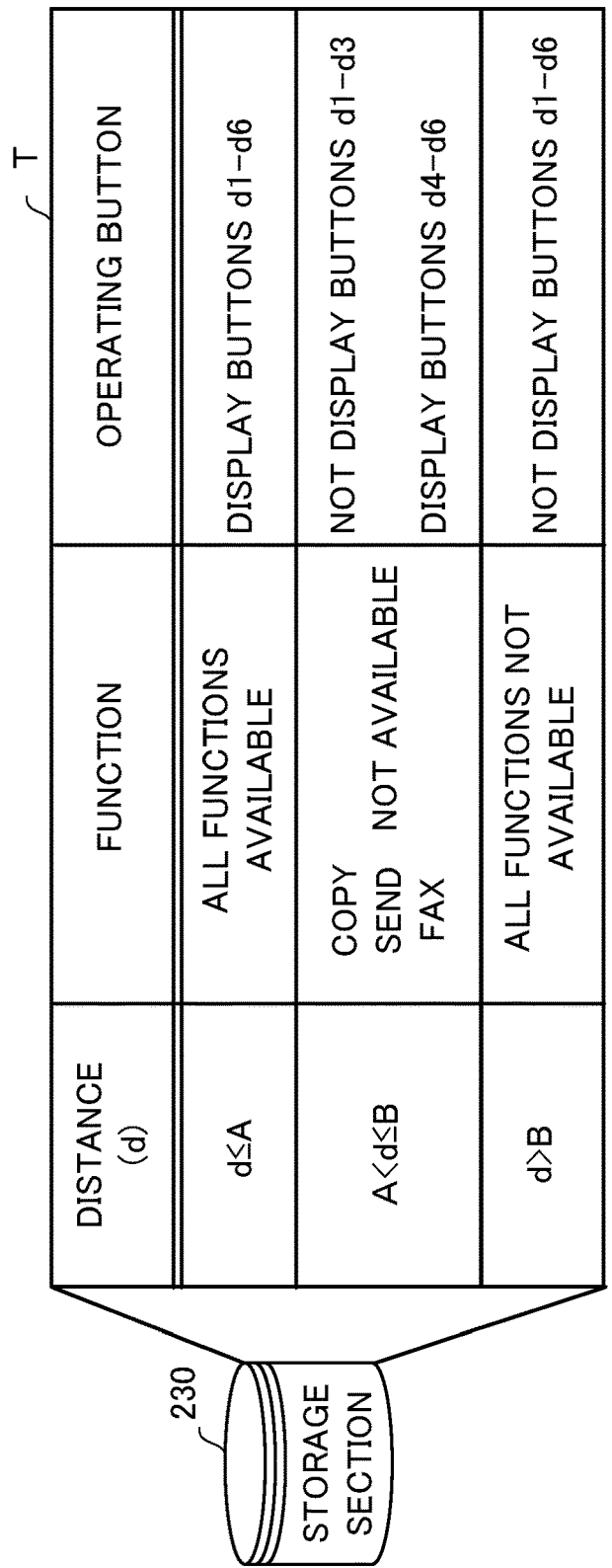
FIG. 6 is a table showing an example of data stored in a storage section of a portable terminal device according to another embodiment of the present disclosure.

FIG. 6 is a table showing an example of data stored in the storage section 230. As shown in this figure, the storage section 230 previously stores tabular information T (correspondence information) related to the functions performable by the image forming apparatus 10 and indicating the correspondence between the distance d between the portable terminal device 20 and the image forming apparatus 10 and a set of functions available depending on the distance. Specifically, the tabular information T indicates that if the distance d between the portable terminal device 20 and the image forming apparatus 10 is equal to or smaller than a predetermined first distance A, the portable terminal device 20 is allowed to instruct the execution of all of the plurality of functions performable by the image forming apparatus 10 and all the operating buttons d1 to d6 provided on the operation screen D1 are allowed to be displayed. The tabular information T also indicates that if the distance d between the portable terminal device 20 and the image forming apparatus 10 is larger than the predetermined first distance A and equal to or smaller than a predetermined second distance B, the portable terminal device 20 is allowed to instruct the execution of some of the plurality of functions performable by the image forming apparatus 10, i.e., functions other than the copy, send, and facsimile functions, and some of the operating buttons provided on the operation screen D1, i.e., a plurality of operating buttons d4 to d6, are allowed to be displayed. Also, the tabular information T indicates that if the distance d between the portable terminal device 20 and the image forming apparatus 10 is larger than the predetermined second distance B, the portable terminal device 20 is not allowed to instruct the execution of all of the plurality of functions performable by the image forming apparatus 10 and all the operating buttons d1 to d6 provided on the operation screen D1 are not allowed to be displayed.

Figure 7:
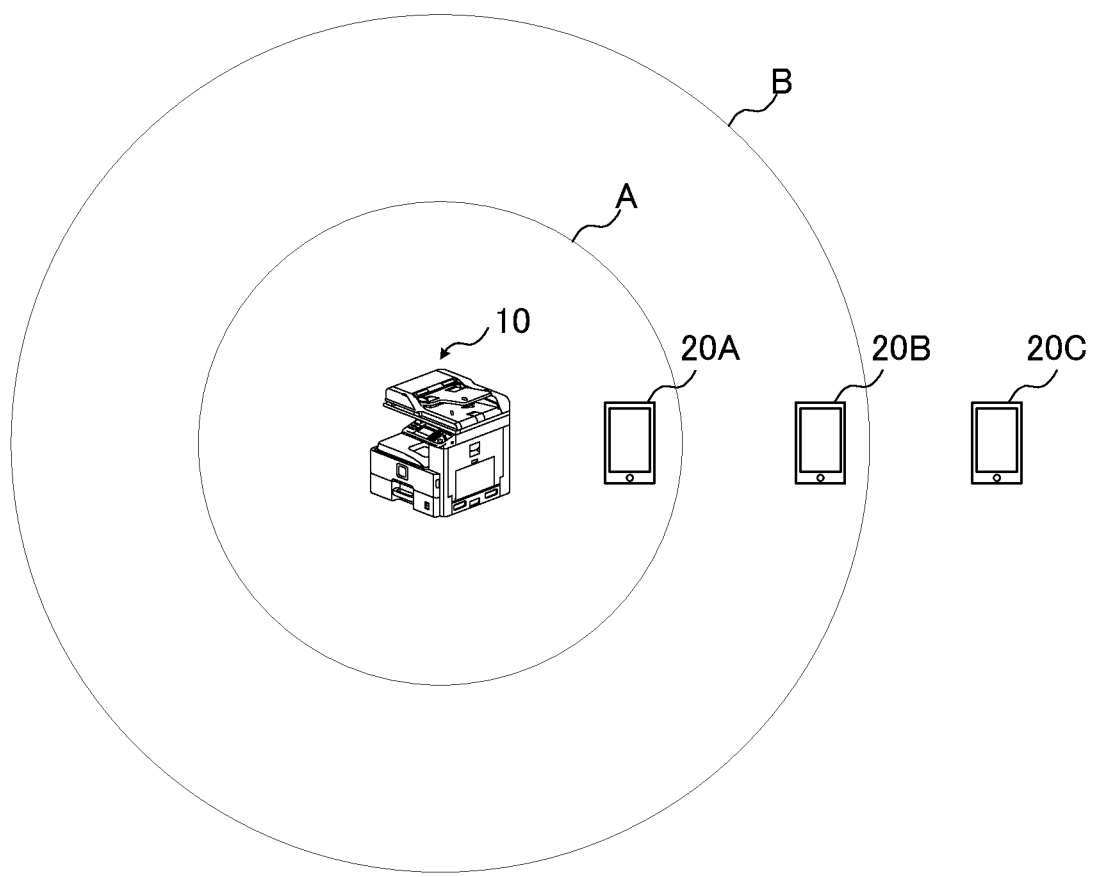
FIG. 7 is a view showing an example of the relative locations of an image forming apparatus and portable terminal devices according to the other embodiment of the present disclosure.
Figure 8A:
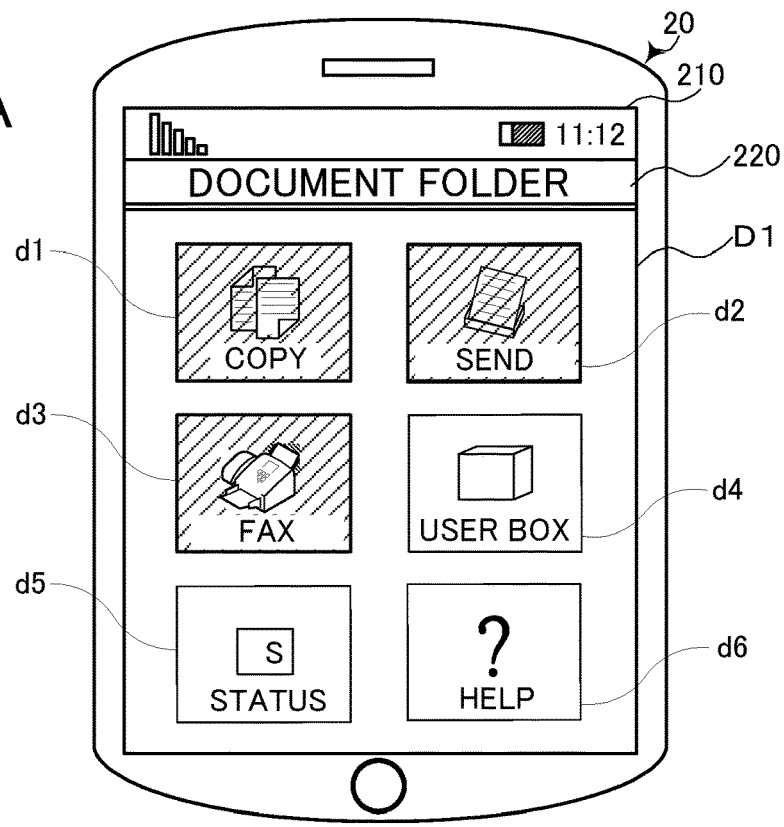
FIGS. 8A and 8B are views showing examples of an operation screen displayed on a display section of the portable terminal device according to the other embodiment of the present disclosure.
Figure 8B:
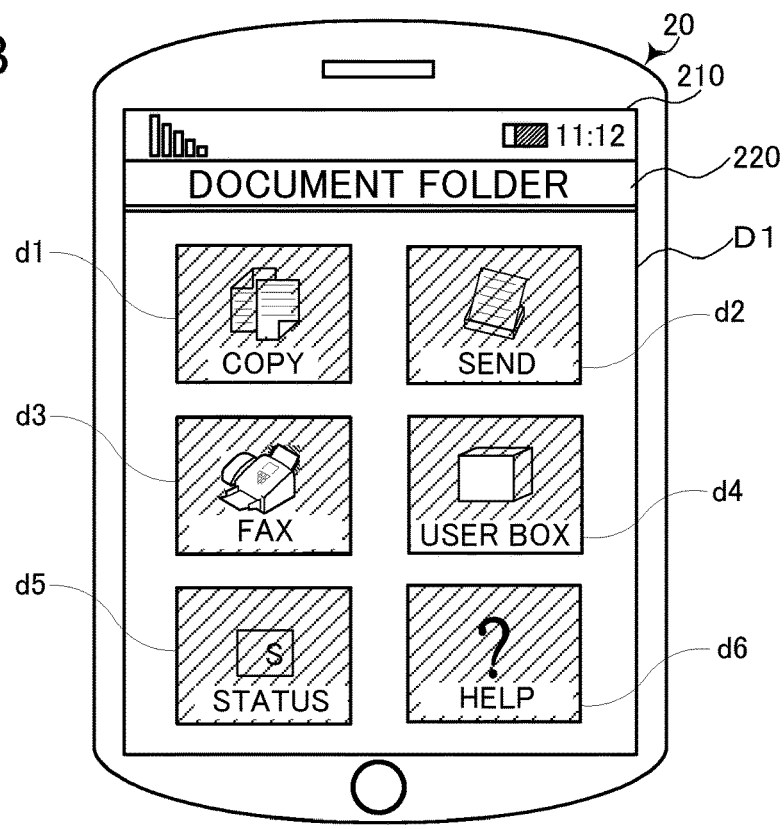

The display control section 202 changes the contents of the plurality of operating buttons provided on the operation screen D1, using the distance between the portable terminal device 20 and the image forming apparatus 10 calculated by the location detecting section 204 and the above tabular information T stored in the storage section 230. For example, in an example shown in FIG. 7, an operation screen D1 as shown in FIG. 3 is displayed on the display section 210 of the portable terminal device 20A the distance of which from the image forming apparatus 10 is equal to or smaller than the predetermined first distance A. Furthermore, an operation screen D1 as shown in FIG. 8A is displayed on the display section 210 of the portable terminal device 20B the distance of which from the image forming apparatus 10 is larger than the predetermined first distance A and equal to or smaller than the predetermined second distance B. In the operation screen D1 shown in FIG. 8A, the display mode of the operating buttons d1 to d3 associated with the copy function, the send function, and the facsimile function is changed from that shown in FIG. 3. When the operation acceptance section 203 accepts a selection operation for selecting any of the above operating buttons d1 to d3, the communication control section 205 does not generate an instruction signal for allowing the function associated with the selected operating button d1 to d3 to be performed and therefore avoids the communication section 240 transmitting the instruction signal to the image forming apparatus 10. On the other hand, when the operation acceptance section 203 accepts a selection operation for selecting any of the operating buttons d4 to d6 the display mode of which is not changed, the communication control section 205 generates an instruction signal for allowing the function associated with the selected operating button d4 to d6 to be performed and allows the communication section 240 to transmit the generated instruction signal to the image forming apparatus 10. Moreover, an operation screen D1 as shown in FIG. 8B is displayed on the display section 210 of the portable terminal device 20C the distance of which from the image forming apparatus 10 is larger than the predetermined second distance B. In the operation screen D1 shown in FIG. 8B, the display mode of all the operating buttons d1 to d6 arranged on the operation screen D1 is changed from that shown in FIG. 3. When the operation acceptance section 203 accepts a selection operation for selecting any of the above operating buttons d1 to d6, the communication control section 205 does not generate an instruction signal for allowing the function associated with the selected operating button d1 to d6 to be performed and therefore avoids the communication section 240 transmitting the instruction signal to the image forming apparatus 10.

Figure 9:
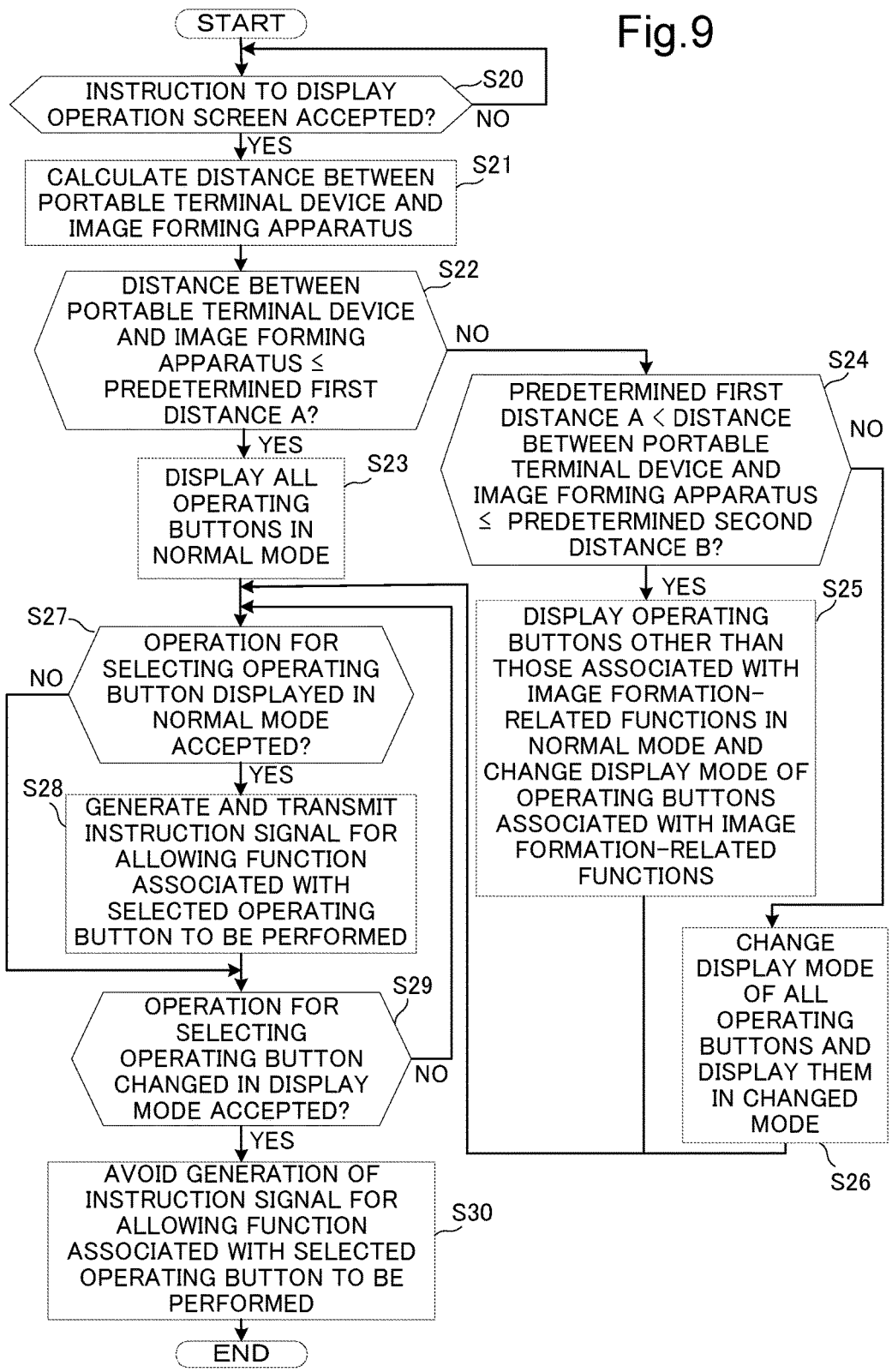
FIG. 9 is a flowchart showing an operation flow of the portable terminal device according to the other embodiment of the present disclosure.

FIG. 9 is a flowchart showing an operation flow of the portable terminal device 20 according to Embodiment 2. When the operation acceptance section 203 accepts an instruction to display the operation screen (YES in step S20), the location detecting section 204 calculates the distance between the portable terminal device 20 and the image forming apparatus 10 (step S21).

Then, if the distance between the portable terminal device 20 and the image forming apparatus 10 is equal to or smaller than the predetermined first distance A (YES in step S22), the display control section 202 allows the display section 210 to display all the operating buttons in a normal display mode (step S23). On the other hand, if the distance between the portable terminal device 20 and the image forming apparatus 10 is larger than the predetermined first distance A and equal to or smaller than the predetermined second distance B (YES in step S24), the display control section 202 allows the display section 210 to display the operating buttons other than the operating buttons associated with the functions related to image formation in a normal display mode and change the display mode of the operating buttons associated with the functions related to image formation (step S25). Alternatively, in the above processing of step S25, instead of changing the display mode of the operating buttons associated with the functions related to image formation, the display control section 202 may keep the display section 210 from displaying these operating buttons.

Specifically, in the above processing from step S22 to step S25 in this embodiment, if the distance between the portable terminal device 20 and the image forming apparatus 10 is equal to or smaller than the predetermined first distance A, the display control section 202 changes the contents of the plurality of operating buttons provided on the operation screen D1 so that they include the operating buttons associated with the functions related to image formation. On the other hand, if the distance is larger than the predetermined first distance A, the display control section 202 changes the contents of the plurality of operating buttons provided on the operation screen D1 so that they do not include the operating buttons associated with the functions related to image formation.

If the distance between the portable terminal device 20 and the image forming apparatus 10 is larger than the predetermined second distance B (NO in step S24), the display control section 202 allows the display section 210 to change the display mode of all the operating buttons (step S26). Alternatively, in the above processing of step S26, instead of changing the display mode of all the operating buttons, the display control section 202 may keep the display section 210 from displaying the operating buttons. Specifically, in the above processing of step S26 in this embodiment, if the distance between the portable terminal device 20 and the image forming apparatus 10 is larger than the predetermined second distance B, the display control section 202 allows the display section 210 to change the display of all of the plurality of operating buttons provided on the operation screen D1 to a display representing that they are inexecutable.

When, after the processing of step S23, S25 or S26, the operation acceptance section 203 accepts a selection operation for selecting any operating button displayed in a normal display mode on the operation screen D1 (YES in step S27), the communication control section 205 executes processing for generating an instruction signal for allowing the function associated with the selected operating button to be performed and allowing the communication section 240 to transmit the generated instruction signal (step S28). On the other hand, when the operation acceptance section 203 accepts a selection operation for selecting any operating button changed in display mode (YES in step S29), the communication control section 205 does not generate an instruction signal for allowing the function associated with the selected operating button to be performed (step S30).

As seen from the above, in the portable terminal device 20 according to Embodiment 2, the contents of an instruction that the portable terminal device 20 can give to the image forming apparatus 10 can be limited depending on to the distance between the portable terminal device 20 and the image forming apparatus 10.

<Supplement 1>

The description in the above Embodiment 2 has been given of the case where when the operation acceptance section 203 accepts a selection operation for selecting any operating button changed in display mode, the communication control section 205 does not generate an instruction signal for allowing the function associated with the selected operating button to be performed. However, the present disclosure is not necessarily limited to this case. For example, in the case where the operation acceptance section 203 accepts a selection operation for selecting an operating button changed in display mode and the selection operation is consecutively input a predetermined number of times (for example, three times) or more, the communication control section 205 may allow the communication section 240 to transmit an instruction signal for allowing the function associated with the selected operating button to be performed.

<Supplement 2>

Figure 10:
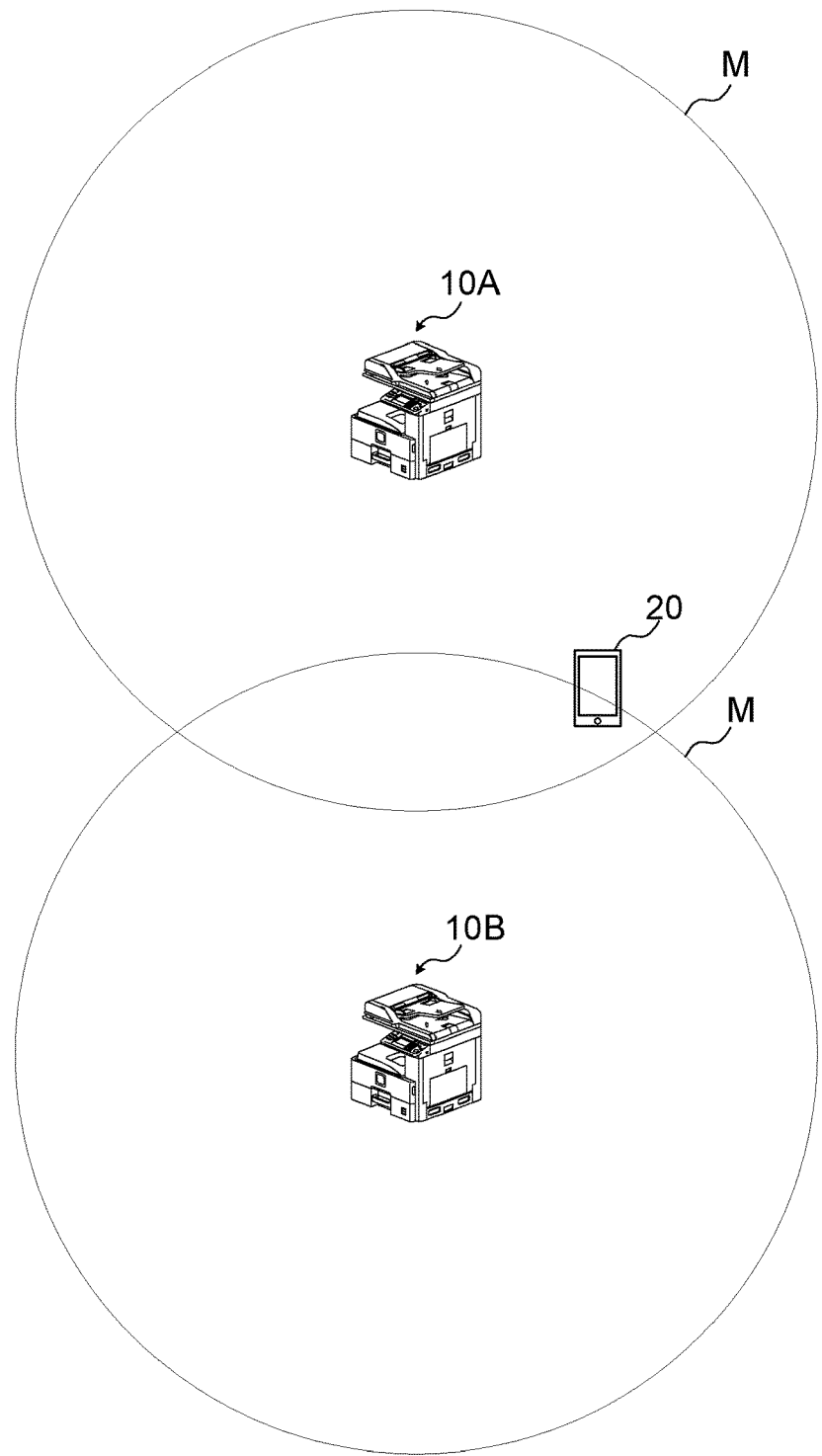
FIG. 10 is a view showing an example of the relative locations of image forming apparatuses and a portable terminal device according to the other embodiment of the present disclosure.
Figure 11A:
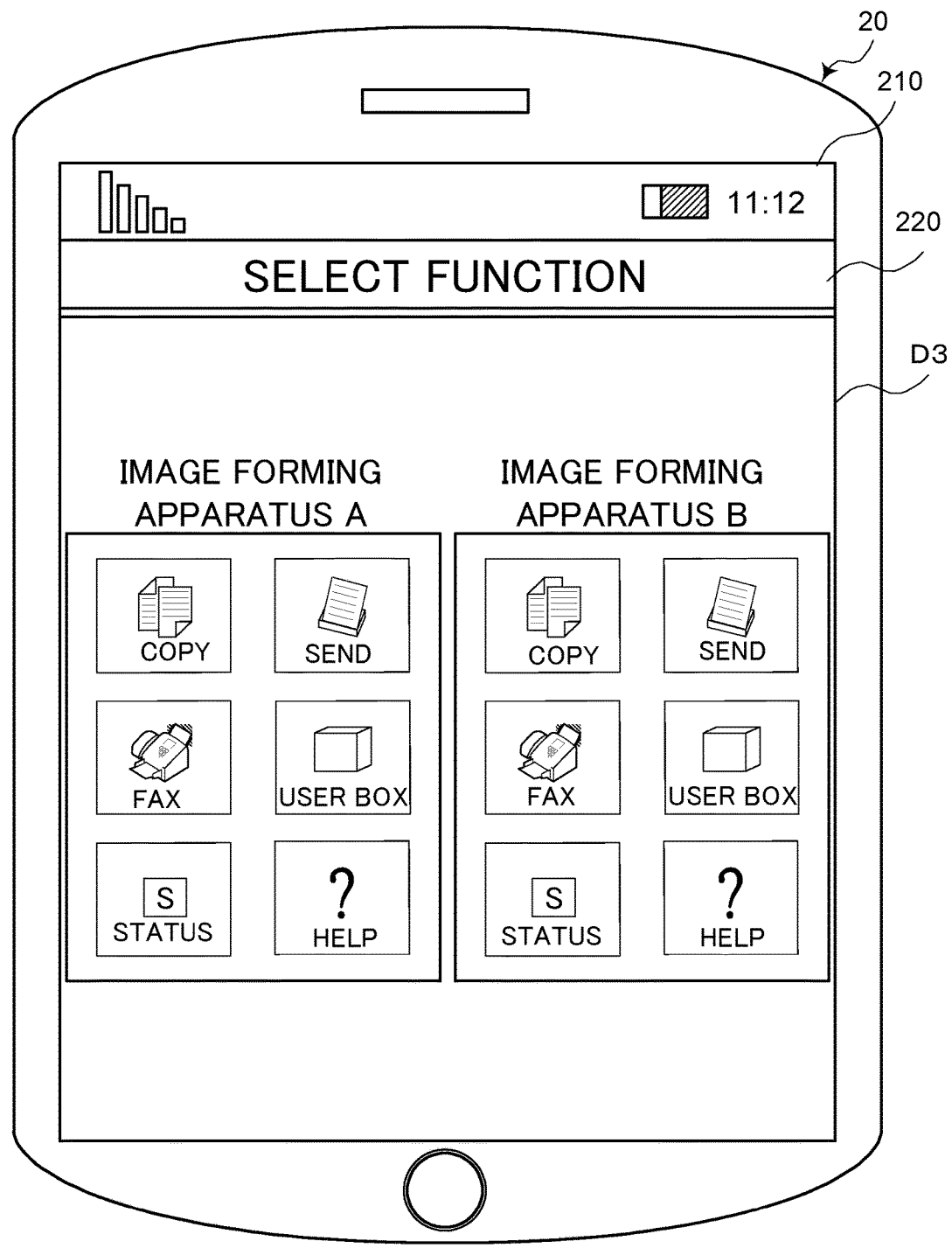
FIGS. 11A and 11B are views showing examples of an operation screen displayed on the display section of the portable terminal device according to the other embodiment of the present disclosure.

As shown in FIG. 10, in the case where a plurality of image forming apparatuses 10A and 10B exist within a predetermined third distance M from the portable terminal device 20, the display control section 202 may allow the display section 210 to display a screen D3 in which a plurality of operation screens for accepting therethrough functions performable on each of the image forming apparatuses 10A and 10B are contained in a single screen (see FIG. 11A).

Figure 11B:
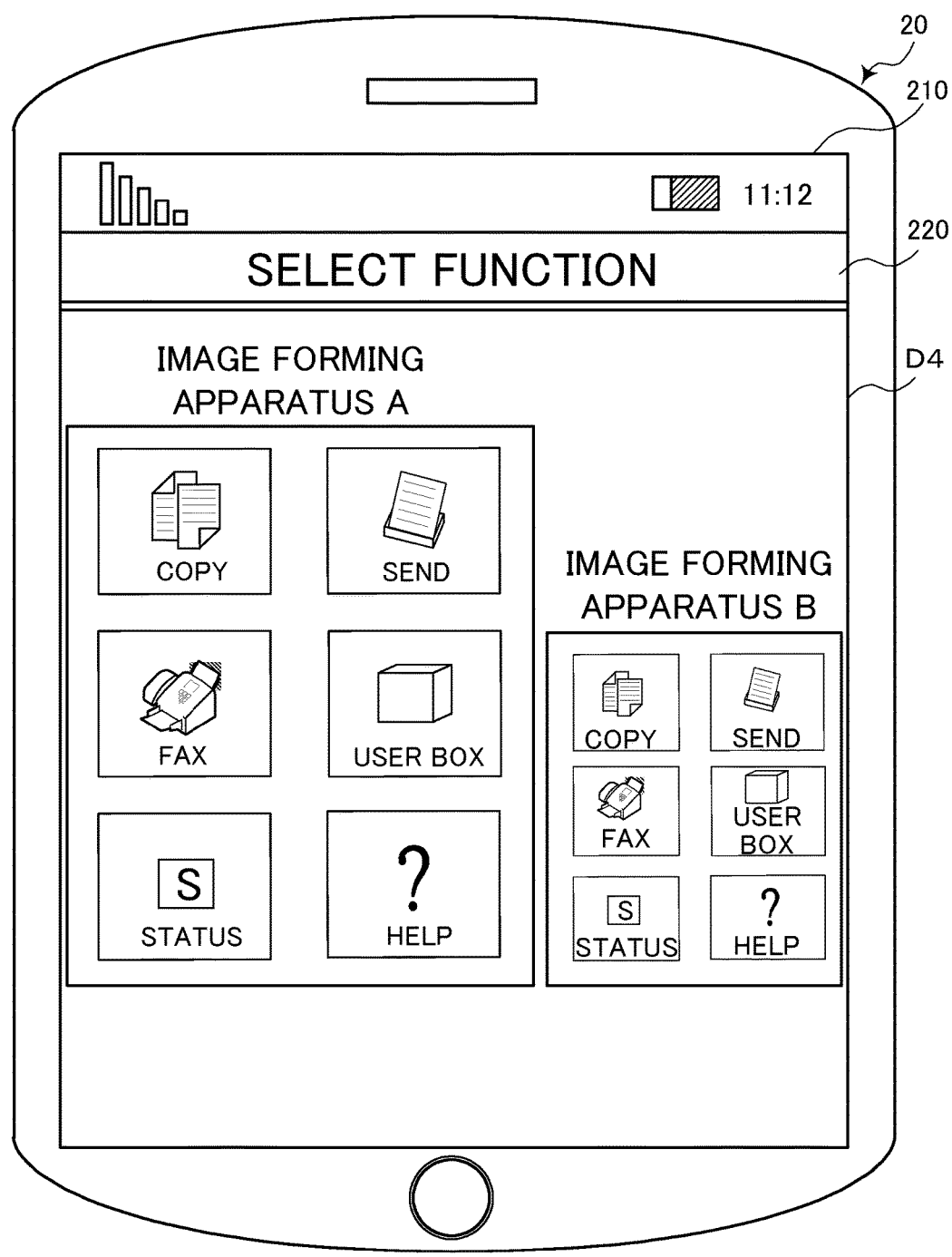

Alternatively, in the case where a plurality of image forming apparatuses 10A and 10B exist within the predetermined third distance M from the portable terminal device 20, the display control section 202 may make the plurality of operation screens in the single screen different in size from each other according to the distance between the portable terminal device 20 and each of the image forming apparatuses 10A and 10B (see FIG. 11B). Specifically, the display control section 202 allows the display section 210 to display a screen D4 so that the nearer each of the image forming apparatuses 10A and 10B is to the portable terminal device 20, the larger its operation screen.

Alternatively, in the case where a plurality of image forming apparatuses 10A and 10B exist within the predetermined third distance M from the portable terminal device 20, the display control section 202 may allow the display section 210 to display an operation screen for accepting therethrough the functions to be performed by the image forming apparatus nearest to the portable terminal device 20 (the image forming apparatus 10A in the example shown in FIG. 10).

When the location of the portable terminal device 20 moves from the position shown in FIG. 10 downward in the plane of the figure, the operation screen to be displayed on the display section 210 switches from an operation screen for accepting therethrough the functions to be performed by the image forming apparatus 10A to an operation screen for accepting therethrough the functions to be performed by the image forming apparatus 10B. On this switching of the operation screen, the display control section 202 may allow the display section 210 to show information on the image forming apparatus 10B to be displayed on the operation screen after the switching, including its location and name.

<Supplement 3>

Although in Embodiment 2 the portable terminal device 20 includes the location detecting section 204, it is possible that the portable terminal device 20 does not include the location detecting section 204 but the image forming apparatus 10 includes a similar location detecting section 105 as shown in FIG. 18. In this case, the communication section 170 (apparatus-side communication section) of the image forming apparatus 10 and the communication section 240 of the portable terminal device 20 communicate with each other, for example, via a wireless LAN and the location detecting section 105 of the image forming apparatus 10 detects the location of the portable terminal device 20 according to a signal (for example, its intensity) from the portable terminal device 20 during the communication via the LAN. The distance detecting section 104 of the image forming apparatus 10 detects, based on the previously stored location of the image forming apparatus 10 and the detected location of the portable terminal device 20, the distance between the image forming apparatus 10 and the portable terminal device 20 as a relative location between the image forming apparatus 10 and the portable terminal device 20. The communication section 170 transmits the relative location to the portable terminal device 20 as needed. In the portable terminal device 20, the communication section 240 receives the relative location and the display control section 202 executes processing for changing the contents of the plurality of operating buttons provided on the operation screen, using the acquired relative location (the distance between the image forming apparatus 10 and the portable terminal device 20) and the above-described tabular information T. The location detecting section 105 and the distance detecting section 104 of the image forming apparatus 10 is an example of the apparatus-side location detecting section defined in What is claimed is.

Embodiment 3

As described previously, the storage section 230 of the portable terminal device 20 previously stores the correspondence information related to the functions performable by the image forming apparatus 10 and indicating the correspondence between the relative location between the portable terminal device 20 and the image forming apparatus 10 and a set of functions available depending on the relative location. In the correspondence information, based on the correspondence between the set of available functions of the image forming apparatus 10 and the relative location between the image forming apparatus 10 and the portable terminal device 20, a first region is defined in which the plurality of operating buttons provided on the operation screen are allowed to be changed to operating buttons associated with the functions related to image formation. In the example shown in FIGS. 6 and 7, the first region is a circular region having a radius A from the point of location of the image forming apparatus 10. Furthermore, in the correspondence information, a second region different from the first region is also defined based on the correspondence between the set of available functions of the image forming apparatus 10 and the relative location between the image forming apparatus 10 and the portable terminal device 20. In the example shown in FIGS. 6 and 7, the second region is a region in which the above first region is excluded from a circular region having a radius B from the point of location of the image forming apparatus 10.

In the portable terminal device 20 according to Embodiment 3, the display section 210 displays a setting screen for accepting therethrough a change in the correspondence information stored in the storage section 230, so that the correspondence information can be changed and the setting of the first and second regions, which are the two highest-order regions, can be changed.

Figure 12:
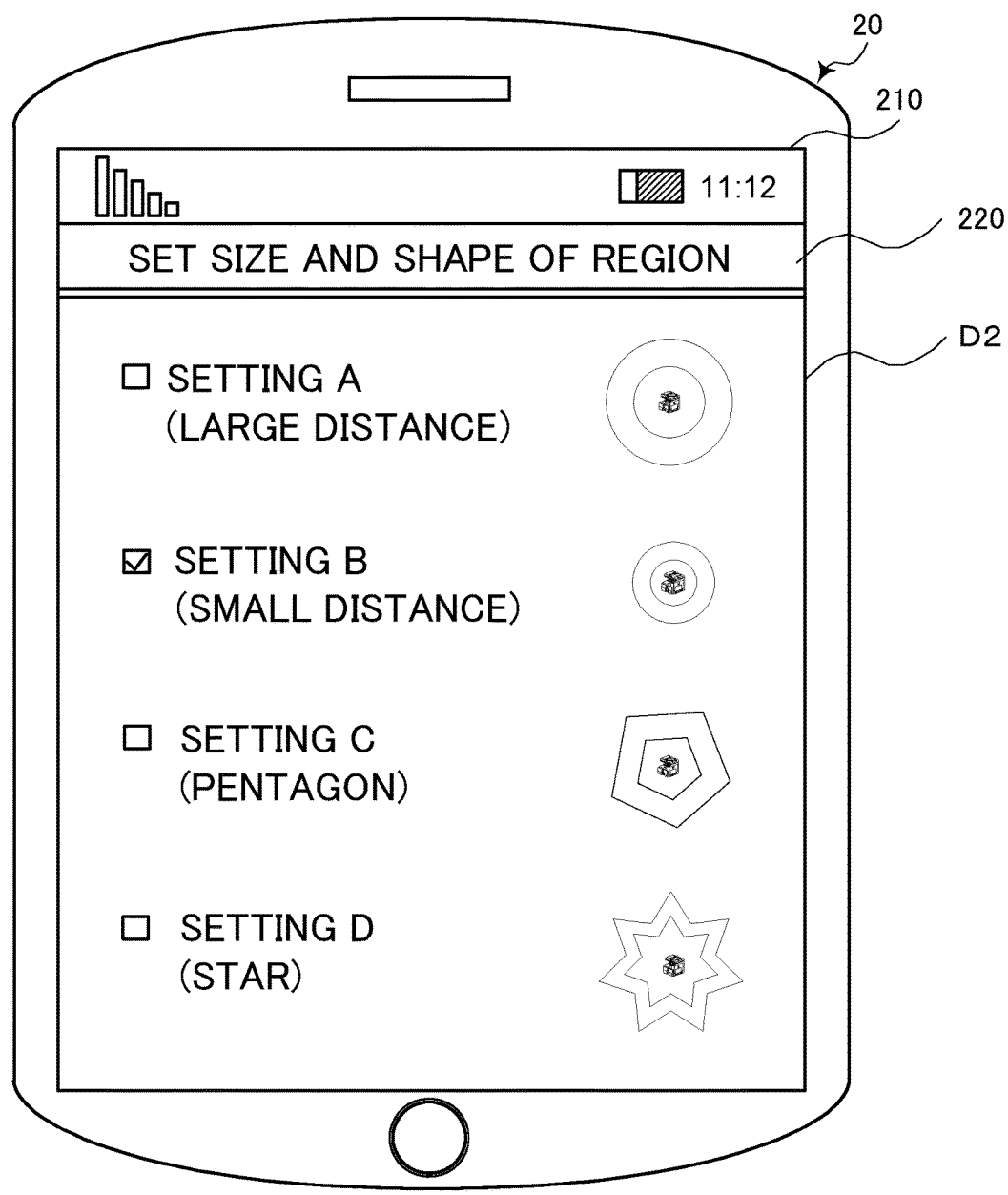
FIG. 12 is a view showing an example of a setting screen displayed on a display section of a portable terminal device according to still another embodiment of the present disclosure.

FIG. 12 is a view showing an example of the setting screen. On the setting screen D2 shown in this figure, four types of sets of regions are displayed as candidates for the first and second regions. When the operation acceptance section 203 accepts a selection operation for selecting one of the plurality of types of sets of regions on the setting screen D2, the storage control section 206 determines the first and second regions based on the selected type of set of regions. Then, the storage control section 206 generates correspondence information indicating the determined first and second regions and allows the storage section 230 to store the generated correspondence information, thus achieving a change in correspondence information. Then, the display control section 202 changes the contents of the plurality of operating buttons provided on the operation screen D1, using the changed correspondence information stored in the storage section 230. Specifically, if the location of the portable terminal device 20 detected by the location detecting section 204 is within the first region defined by the correspondence information, the display control section 202 changes the contents of the plurality of operating buttons provided on the operation screen D1 so that they include the operating buttons associated with the functions related to image formation. On the other hand, if the location of the portable terminal device 20 is outside the first region, the display control section 202 changes the contents of the plurality of operating buttons provided on the operation screen D1 so that they do not include the operating buttons associated with the functions related to image formation. Furthermore, if the location of the portable terminal device 20 detected by the location detecting section 204 is outside the second region, the display control section 202 changes all of the plurality of operating buttons provided on the operation screen D1 to a display representing that they are inexecutable.

As seen from the above, in the portable terminal device 20 according to Embodiment 3, the first region for use in allowing the plurality of operating buttons provided on the operation screen to be changed to operating buttons associated with the functions related to image formation and the second region can be changed to regions desired by the user.

Figure 13:
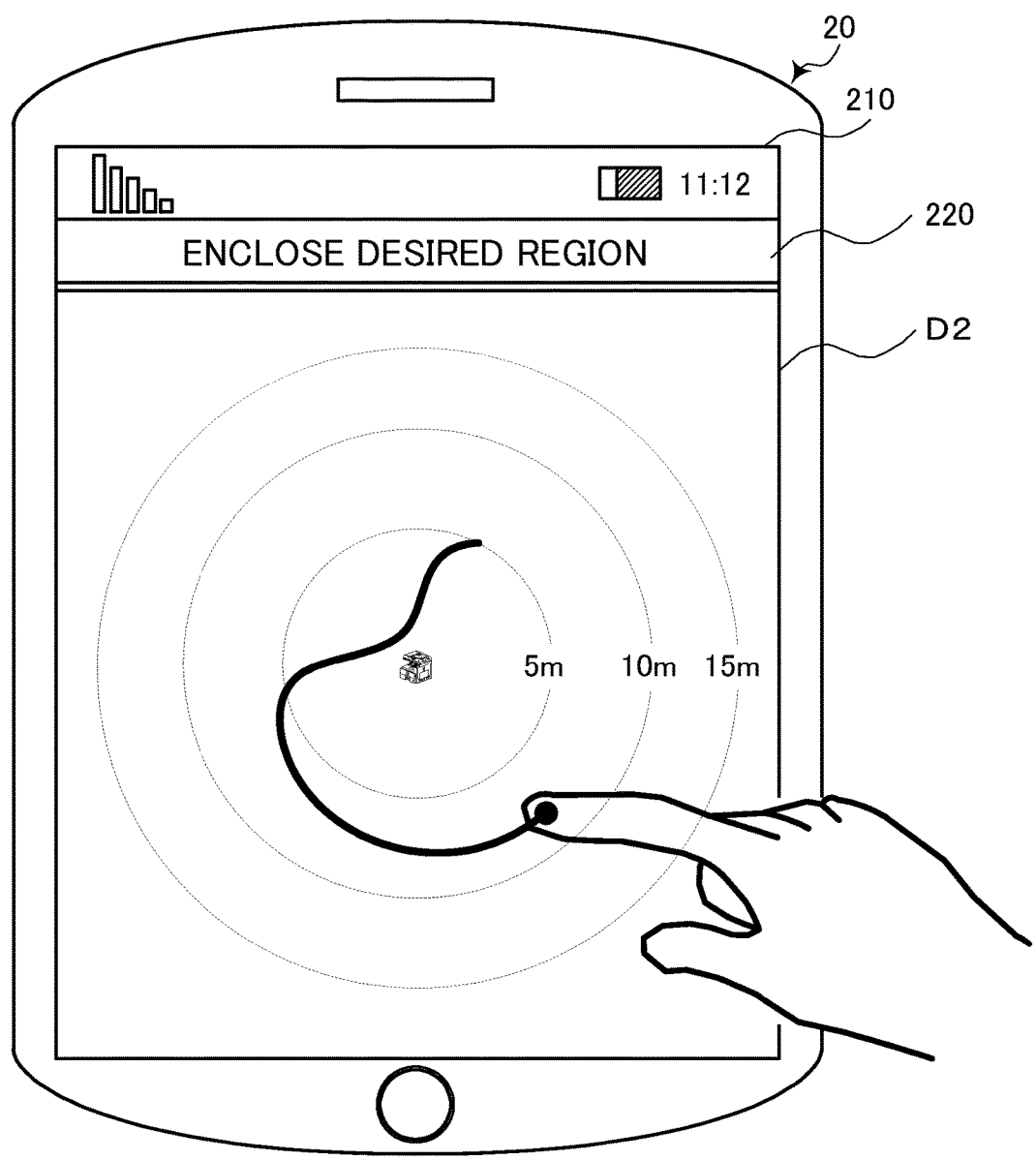
FIG. 13 is a view showing an example of a setting screen displayed on the display section of the portable terminal device according to the still other embodiment of the present disclosure.

The display control section 202 may allow the display section 210 to display a screen shown in FIG. 13 as a setting screen for accepting therethrough a change in correspondence information. A slide gesture of the user can be accepted through the setting screen D2 shown in FIG. 13. The storage control section 206 determines the first and second regions based on regions each enclosed by a locus of a slide gesture input on the setting screen D2. In this manner, with slide gestures which are intuitive operations, the first and second regions can be changed to regions desired by the user.

Embodiment 4

As described previously, if the distance between the portable terminal device 20 and the image forming apparatus 10 calculated by the location detecting section 204 is equal to or smaller than a predetermined first threshold value, the display control section 202 changes the contents of the plurality of operating buttons provided on the operation screen D1 so that they include one or more operating buttons associated with a predetermined function (for example, the image formation function) of the plurality of functions to be performed by the image forming apparatus 10. If the above distance is larger than the first threshold value, the display control section 202 changes the contents of the plurality of operating buttons provided on the operation screen D1 so that they do not include the one or more operating buttons associated with the predetermined function. If the above distance is larger than a predetermined second threshold value larger than the first threshold value, the display control section 202 changes all of the plurality of operating buttons provided on the operation screen D1 to a display representing that they are inexecutable.

In the portable terminal device 20 according to Embodiment 4, whether the location of the portable terminal device 20 is approaching or leaving the image forming apparatus 10 is determined based on the change per unit time in the distance between the portable terminal device 20 and the image forming apparatus 10 calculated by the location detecting section 204, and the above first and second threshold values are changed based on the determination result of the location of the portable terminal device 20.

Figure 14:
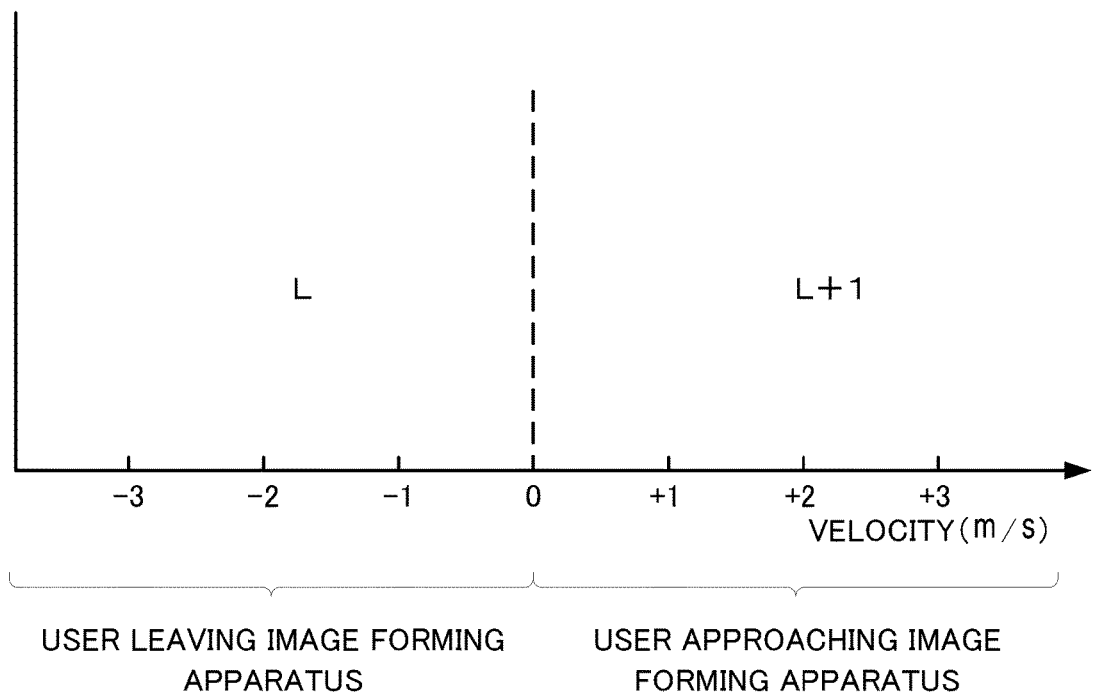
FIG. 14 is a chart showing an example of changes in a first threshold value.
Figure 15A:
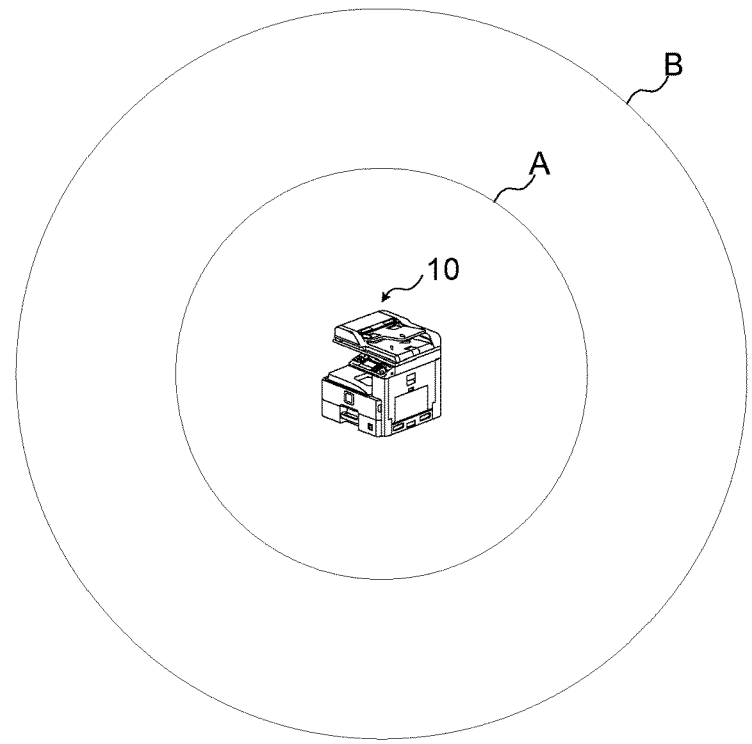
FIGS. 15A and 15B are views showing examples of a first region and a second region.
Figure 15B:
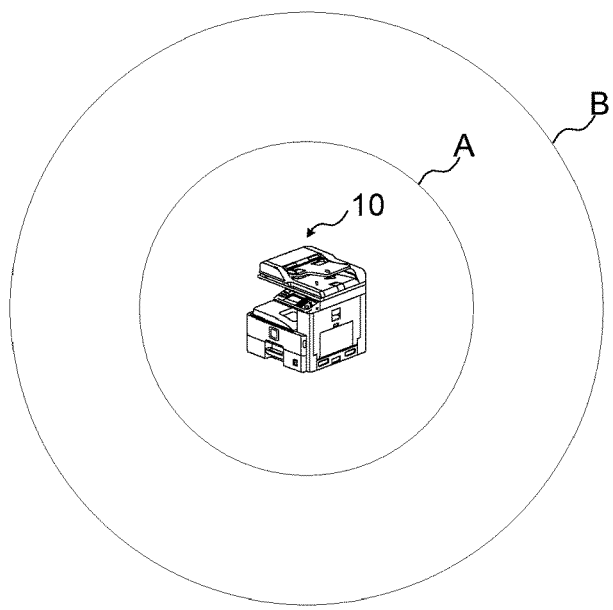

FIG. 14 is a chart showing an example of changes in the first threshold value. In the example shown in this figure, the velocity of the portable terminal device 20 moving toward the image forming apparatus 10 is represented as a positive velocity, while the velocity thereof moving away from the image forming apparatus 10 is represented as a negative velocity. As shown in this figure, the first threshold value when the location of the portable terminal device 20 is approaching the image forming apparatus 10 is larger than that when the location of the portable terminal device 20 is leaving the image forming apparatus 10. Likewise, the second threshold value when the location of the portable terminal device 20 is approaching the image forming apparatus 10 is larger than that when the location of the portable terminal device 20 is leaving the image forming apparatus 10. Thus, the first region for use in allowing the plurality of operating buttons provided on the operation screen D1 to be changed to operating buttons associated with the functions related to image formation and the second region are, for example, as shown in FIGS. 15A and 15B. As a result, when approaching the image forming apparatus 10, the user is early allowed to input an instruction to the image forming apparatus 10. On the other hand, when leaving the image forming apparatus 10, the user is early kept from inputting an instruction to the image forming apparatus 10.

FIGS. 16A and 16B are flowcharts showing an operation flow of the portable terminal device 20 according to Embodiment 4. When the operation acceptance section 203 accepts an instruction to display the operation screen (YES in step S40), the location detecting section 204 calculates the distance between the portable terminal device 20 and the image forming apparatus 10 (step S41). Furthermore, the location detecting section 204 determines, based on the change per unit time in the distance between the portable terminal device 20 and the image forming apparatus 10, whether the location of the portable terminal device 20 is approaching or leaving the image forming apparatus 10 (step S42).

If the location of the portable terminal device 20 is approaching the image forming apparatus 10 (YES in step S43), the display control section 202 increases the first and second threshold values (step S44). On the other hand, if the location of the portable terminal device 20 is leaving the image forming apparatus 10 (NO in step S43), the display control section 202 decreases the first and second threshold values (step S45).

Then, if the distance between the portable terminal device 20 and the image forming apparatus 10 is equal to or smaller than the first threshold value (YES in step S46), the display control section 202 allows the display section 210 to display all the operating buttons in a normal display mode (step S47). On the other hand, if the distance between the portable terminal device 20 and the image forming apparatus 10 is larger than the first threshold value and equal to or smaller than the second threshold value (YES in step S48), the display control section 202 allows the display section 210 to display the operating buttons other than the operating buttons associated with the functions related to image formation in a normal display mode and change the display mode of the operating buttons associated with the functions related to image formation (step S49).

Specifically, in the above processing from step S46 to step S49, if the distance between the portable terminal device 20 and the image forming apparatus 10 is equal to or smaller than the first threshold value, the display control section 202 changes the contents of the plurality of operating buttons provided on the operation screen D1 so that they include the operating buttons associated with the functions related to image formation. On the other hand, if the distance is larger than the first threshold value, the display control section 202 changes the contents of the plurality of operating buttons provided on the operation screen D1 so that they do not include the operating buttons associated with the functions related to image formation.

If the distance between the portable terminal device 20 and the image forming apparatus 10 is larger than the second threshold value (NO in step S48), the display control section 202 allows the display section 210 to change the display mode of all the operating buttons (step S50). Alternatively, in the above processing of step S50, instead of changing the display mode of all the operating buttons, the display control section 202 may keep the display section 210 from displaying the operating buttons. Specifically, in the above processing of step S50 in this embodiment, if the distance between the portable terminal device 20 and the image forming apparatus 10 is larger than the second threshold value, the display control section 202 allows the display section 210 to change the display of all of the plurality of operating buttons provided on the operation screen D1 to a display representing that they are inexecutable.

When, after the processing of step S47, S49 or S50, the operation acceptance section 203 accepts a selection operation for selecting any operating button displayed in a normal display mode on the operation screen D1 (YES in step S51), the communication control section 205 executes processing for generating an instruction signal for allowing the function associated with the selected operating button to be performed and allowing the communication section 240 to transmit the generated instruction signal (step S52). On the other hand, when the operation acceptance section 203 accepts a selection operation for selecting any operating button changed in display mode (YES in step S53), the communication control section 205 does not generate an instruction signal for allowing the function associated with the selected operating button to be performed (step S54).

<Supplement 1>

Figure 17:
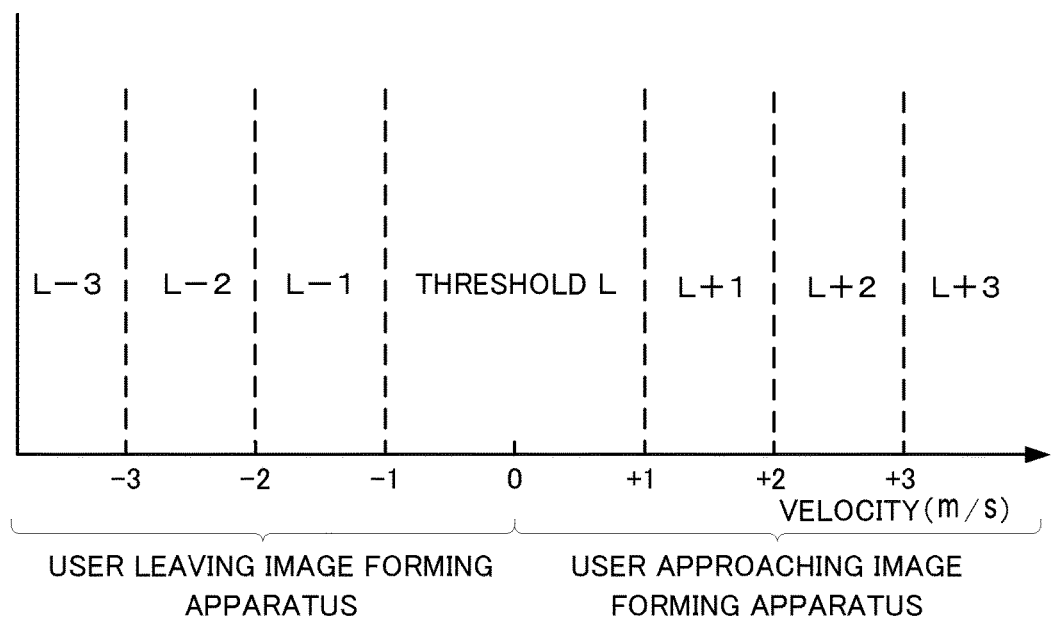
FIG. 17 is a chart showing an example of changes in the first threshold value.

In the case where the location detecting section 204 determines that the location of the portable terminal device 20 is approaching the image forming apparatus 10, the display control section 202 may incrementally increase the first and second threshold values with increasing moving velocity of the portable terminal device 20. In the case where the location detecting section 204 determines that the location of the portable terminal device 20 is leaving the image forming apparatus 10, the display control section 202 may incrementally decrease the first and second threshold values with increasing moving velocity of the portable terminal device 20. In this case, the first threshold value changes as shown in FIG. 17. As seen from the figure, as the moving velocity of the portable terminal device 20 approaching the image forming apparatus 10 increases, the first threshold value increases from L to L+1, then to L+2, and then L+3. On the other hand, as the moving velocity of the portable terminal device 20 leaving the image forming apparatus 10 increases, the first threshold value decreases from L to L−1, then to L−2, and then to L−3. As a result, when approaching the image forming apparatus 10 at a higher velocity, the user is more early allowed to input an instruction to the image forming apparatus 10. On the other hand, when leaving the image forming apparatus 10 at a higher velocity, the user is more early kept from inputting an instruction to the image forming apparatus 10.

<Supplement 2>

Although in Embodiment 4 the portable terminal device 20 includes the location detecting section 204, it is possible that the portable terminal device 20 does not include the location detecting section 204 but the image forming apparatus 10 includes a similar location detecting section 105 as shown in FIG. 18. In this case, the communication section 170 (apparatus-side communication section) of the image forming apparatus 10 and the communication section 240 of the portable terminal device 20 communicate with each other, for example, via a wireless LAN and the location detecting section 105 of the image forming apparatus 10 detects the location of the portable terminal device 20 according to a signal (for example, its intensity) from the portable terminal device 20 during the communication via the LAN. The distance detecting section 104 of the image forming apparatus 10 detects, based on the previously stored location of the image forming apparatus 10 and the detected location of the portable terminal device 20, the inter-apparatus distance between the image forming apparatus 10 and the portable terminal device 20. Furthermore, the location detecting section 105 of the image forming apparatus 10 determines, based on a change in the inter-apparatus distance, whether the location of the portable terminal device 20 is approaching or leaving the image forming apparatus 10. The communication section 170 transmits the determination result to the portable terminal device 20 as needed. In the portable terminal device 20, the communication section 240 receives the determination result and the display control section 220 executes the above processing for increasing or decreasing the first and second threshold values, using the determination result (information indicating that the location of the portable terminal device 20 is approaching or leaving the image forming apparatus 10). The location detecting section 105 and the distance detecting section 104 of the image forming apparatus 10 is an example of the electronic apparatus-side location detecting section defined in What is claimed is.

<Supplement 3>

In the above Embodiment 4, the display control section 202 of the portable terminal device 20 performs both the following actions: (a) if the determination result transmitted from the image forming apparatus 10 and received by the communication section 240 indicates that the location of the portable terminal device 20 is approaching the image forming apparatus 10, the display control section 202 increases the first and second threshold values and uses the increased first and second threshold values for the processing of display control of whether to incorporate the above-described operating buttons into the operation screen D1; and (b) if the above determination result indicates that the location of the portable terminal device 20 is leaving the image forming apparatus 10, the display control section 202 decreases the first and second threshold values and uses the decreased first and second threshold values for the processing of display control of whether to incorporate the above-described operating buttons into the operation screen D1. However, the display control section 202 is not limited to perform both the above actions using the determination result and may perform only one of the two actions (a) and (b).

While the present disclosure has been described in detail with reference to the embodiments thereof, it would be apparent to those skilled in the art the various changes and modifications may be made therein within the scope defined by the appended claims.

What is claimed is:

1. An electronic system comprising an electronic apparatus and a mobile terminal that transmits instruction signals to the electronic apparatus to allow the electronic apparatus to perform a plurality of functions,
   the electronic apparatus comprising a control unit that includes a processor and functions, through the processor executing a control program, as:
   a distance detecting section that detects a distance from the mobile terminal; and
   an operation control section that performs a function indicated by the instruction signal transmitted from the mobile terminal when the distance from the mobile terminal detected by the distance detecting section is within a predetermined distance,
   wherein when a plurality of the mobile terminals exist within the predetermined distance and transmit the respective instruction signals for allowing the electronic apparatus to perform the same function, the operation control section performs the function indicated by the instruction signal transmitted from, of the plurality of the mobile terminals, the mobile terminal located nearest to the electronic apparatus,
   wherein the mobile terminal comprises:
   a communication section capable of transferring data to and from the electronic apparatus;
   a display section; and
   a control unit that includes a processor and functions, through the processor executing a control program, as:
   a communication control section that controls a communication operation of the communication section;
   a display control section that controls a display operation of the display section and allows the display section to display an operation screen for accepting therethrough a function to be performed by the electronic apparatus;
   an operation acceptance section that accepts a user's operation on the operation screen displayed on the display section; and
   a location detecting section that detects a location of the mobile terminal,
   wherein a plurality of operating buttons associated with the respective functions performable by the electronic apparatus are provided on the operation screen,
   wherein when the operation acceptance section accepts a selection operation for selecting one of the plurality of operating buttons provided on the operation screen, the communication control section allows the communication section to transmit to the electronic apparatus an instruction signal for allowing the electronic apparatus to perform the function associated with the selected operating button,
   wherein the display control section changes, according to a relative location between the location of the mobile terminal detected by the location detecting section and a location of the electronic apparatus, contents of the plurality of operating buttons provided on the operation screen,
   wherein the location detecting section calculates, based on the detected location of the mobile terminal, a distance between the mobile terminal and the electronic apparatus,
   wherein the display control section uses, as the relative location between the mobile terminal and the electronic apparatus, the distance between the mobile terminal and the electronic apparatus calculated by the location detecting section and changes, according to the calculated distance, the contents of the plurality of operating buttons provided on the operation screen,
   wherein the mobile terminal further comprises a storage section that stores tabular information related to the functions performable by the electronic apparatus and indicating correspondence between the distance between the mobile terminal and the electronic apparatus and a set of functions available depending on the distance, and
   wherein the display control section changes the contents of the plurality of operating buttons provided on the operation screen, using the distance between the mobile terminal and the electronic apparatus calculated by the location detecting section and the tabular information stored in the storage section.

2. The electronic system according to claim 1, wherein when a plurality of the electronic apparatuses exist within a predetermined third distance from the mobile terminal, the display control section allows the display section to display a screen in which a plurality of operation screens for accepting therethrough functions performable on each of the electronic apparatuses are contained in a single screen.

3. The electronic system according to claim 2, wherein when the plurality of the electronic apparatuses exist within the third distance from the mobile terminal, the display control section makes the plurality of operation screens in the single screen different in size from each other according to the distance between the mobile terminal and each of the plurality of electronic apparatuses.

4. The electronic system according to claim 3, wherein the display control section makes the plurality of operation screens different in size from each other so that the nearer each of the electronic apparatuses is to the mobile terminal, the larger the operation screen thereof.

5. The electronic system according to claim 1, wherein when a plurality of the electronic apparatuses exist within a predetermined third distance from the mobile terminal, the display control section allows the display section to display an operation screen for accepting therethrough functions to be performed by, of the plurality of electronic apparatuses, the electronic apparatus nearest to the mobile terminal.

6. The electronic system according to claim 5, wherein when the operation screen displayed on the display section is changed to an operation screen for accepting therethrough functions to be performed by another electronic apparatus because of a change in the location of the mobile terminal, the display control section allows the changed operation screen to show information on the other electronic apparatus.

7. An electronic system comprising an electronic apparatus and a mobile terminal that transmits instruction signals to the electronic apparatus to allow the electronic apparatus to perform a plurality of functions, the electronic apparatus comprising a control unit that includes a processor and functions, through the processor executing a control program, as:
a distance detecting section that detects a distance from the mobile terminal; and
an operation control section that performs a function indicated by the instruction signal transmitted from the mobile terminal when the distance from the mobile terminal detected by the distance detecting section is within a predetermined distance,
wherein when a plurality of the mobile terminals exist within the predetermined distance and transmit the respective instruction signals for allowing the electronic apparatus to perform the same function, the operation control section performs the function indicated by the instruction signal transmitted from, of the plurality of the mobile terminals, the mobile terminal located nearest to the electronic apparatus,
wherein the mobile terminal comprises:
a communication section capable of transferring data to and from the electronic apparatus;
a display section; and
a control unit that includes a processor and functions, through the processor executing a control program, as:
a communication control section that controls a communication operation of the communication section;
a display control section that controls a display operation of the display section and allows the display section to display an operation screen for accepting therethrough a function to be performed by the electronic apparatus;
an operation acceptance section that accepts a user's operation on the operation screen displayed on the display section; and
a location detecting section that detects a location of the mobile terminal,
wherein a plurality of operating buttons associated with the respective functions performable by the electronic apparatus are provided on the operation screen,
wherein when the operation acceptance section accepts a selection operation for selecting one of the plurality of operating buttons provided on the operation screen, the communication control section allows the communication section to transmit to the electronic apparatus an instruction signal for allowing the electronic apparatus to perform the function associated with the selected operating button,
wherein the display control section changes, according to a relative location between the location of the mobile terminal detected by the location detecting section and a location of the electronic apparatus, contents of the plurality of operating buttons provided on the operation screen,
wherein the location detecting section calculates, based on the detected location of the mobile terminal, a distance between the mobile terminal and the electronic apparatus,
wherein the display control section uses, as the relative location between the mobile terminal and the electronic apparatus, the distance between the mobile terminal and the electronic apparatus calculated by the location detecting section and changes, according to the calculated distance, the contents of the plurality of operating buttons provided on the operation screen, wherein the electronic apparatus is an image forming apparatus that forms an image on a recording sheet,
wherein if the distance between the mobile terminal and the electronic apparatus calculated by the location detecting section is equal to or smaller than a predetermined first distance, the display control section changes the contents of the plurality of operating buttons provided on the operation screen so that the plurality of operating buttons include an operating button associated with a function related to image formation, and
wherein if the distance is larger than the first distance, the display control section changes the contents of the plurality of operating buttons provided on the operation screen so that the plurality of operating buttons do not include the operating button associated with the function relatrelated to image formation.

8. The electronic system according to claim 7, wherein if the distance between the mobile terminal and the electronic apparatus calculated by the location detecting section is larger than a predetermined second distance larger than the first distance, the display control section changes all of the plurality of operating buttons provided on the operation screen to a display representing that the plurality of operating buttons are inexecutable.

9. An electronic system comprising an electronic apparatus and a mobile terminal that transmits instruction signals to the electronic apparatus to allow the electronic apparatus to perform a plurality of functions, the electronic apparatus comprising a control unit that includes a processor and functions, through the processor executing a control program, as:
a distance detecting section that detects a distance from the mobile terminal; and
an operation control section that performs a function indicated by the instruction signal transmitted from the mobile terminal when the distance from the mobile terminal detected by the distance detecting section is within a predetermined distance,
wherein when a plurality of the mobile terminals exist within the predetermined distance and transmit the respective instruction signals for allowing the electronic apparatus to perform the same function, the operation control section performs the function indicated by the instruction signal transmitted from, of the plurality of the mobile terminals, the mobile terminal located nearest to the electronic apparatus,
wherein the mobile terminal comprises:
a communication section capable of transferring data to and from the electronic apparatus;
a display section; and
a control unit that includes a processor and functions, through the processor executing a control program, as:
a communication control section that controls a communication operation of the communication section;
a display control section that controls a display operation of the display section and allows the display section to display an operation screen for accepting therethrough a function to be performed by the electronic apparatus; and
an operation acceptance section that accepts a user's operation on the operation screen displayed on the display section;
wherein a plurality of operating buttons associated with the respective functions performable by the electronic apparatus are provided on the operation screen, wherein the display control section changes the contents of the plurality of operating buttons provided on the operation screen by changing a display mode of the plurality of operating buttons, and wherein if the operation acceptance section accepts a selection operation for selecting one of the plurality of operating buttons and the selected operating button is an operating button changed in the display mode, the communication control section avoids the communication section transmitting the instruction signal for allowing the electronic apparatus to perform the function associated with the selected operating button.

10. The electronic system according to claim 9, wherein if the operation acceptance section accepts the selection operation for selecting one of the plurality of operating buttons, the selected operating button is an operating button changed in the display mode, and the selection operation is consecutively input a predetermined number of times or more, then the communication control section allows the communication section to transmit to the electronic apparatus the instruction signal for allowing the electronic apparatus to perform the function associated with the selected operating button.

\* \* \* \* \*